US011294622B2

(12) United States Patent
Jayakumar et al.

(10) Patent No.: US 11,294,622 B2
(45) Date of Patent: *Apr. 5, 2022

(54) AUDIO OUTPUT CONTROL

(71) Applicant: Amazon Technologies, Inc., Seattle, WA (US)

(72) Inventors: Gautham Kumar Jayakumar, Seattle, WA (US); Nishant Kumar, Sunnyvale, CA (US); Steven Michael Saxon, Irvine, CA (US); Frederic Johan Georges Deramat, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,156

(22) Filed: Nov. 30, 2020

(65) Prior Publication Data

US 2021/0109706 A1 Apr. 15, 2021

Related U.S. Application Data

(63) Continuation of application No. 16/222,751, filed on Dec. 17, 2018, now Pat. No. 10,853,031, which is a (Continued)

(51) Int. Cl.
*G06F 3/16* (2006.01)
*H04R 27/00* (2006.01)
(Continued)

(52) U.S. Cl.
CPC .............. *G06F 3/167* (2013.01); *G06F 3/165* (2013.01); *G10L 15/22* (2013.01); *H04R 3/12* (2013.01);
(Continued)

(58) Field of Classification Search
CPC ......... G06F 3/165; G06F 3/167; G10L 15/22; G10L 2015/228; G10L 2015/223; H04R 27/00; H04R 2227/003; H04R 2227/005
(Continued)

(56) References Cited

U.S. PATENT DOCUMENTS 9,431,021 B1 8/2016 Scalise et al.
2017/0025124 A1 1/2017 Mixter et al.
(Continued)

OTHER PUBLICATIONS

Office Action for U.S. Appl. No. 16/222,751, dated Dec. 13, 2019, Jayakumar, "Audio Output Control", 11 Pages.
(Continued)

*Primary Examiner* — Melur Ramakrishnaiah
(74) *Attorney, Agent, or Firm* — Lee & Hayes, P.C.

(57) ABSTRACT

Systems and methods for audio output control are disclosed. Audio may be output via a speaker of a communal device associated with a first portion of an environment. A user may provide a user utterance indicating an intent to add another device in a second portion of the environment to the audio-output session, and/or an intent to move the audio-output session from the first device to the second device, and/or an intent to remove a device from an audio-output session. Based on this determined intent, audio-session queues may be associated and dissociated from devices and device states may be altered to effectuate the intent of the user utterance.

20 Claims, 13 Drawing Sheets

Related U.S. Application Data continuation of application No. 15/889,754, filed on Feb. 6, 2018, now Pat. No. 10,157,042.

(51) Int. Cl.
*G10L 15/22* (2006.01)
*H04R 3/12* (2006.01)

(52) U.S. Cl.
CPC ........ *H04R 27/00* (2013.01); *G10L 2015/223* (2013.01); *G10L 2015/228* (2013.01); *H04R 2227/003* (2013.01); *H04R 2227/005* (2013.01); *H04R 2227/009* (2013.01); *H04R 2420/07* (2013.01)

(58) Field of Classification Search
USPC .......................................................... 700/94
See application file for complete search history.

(56) References Cited

U.S. PATENT DOCUMENTS

| | | |
|---|---|---|
| 2017/0236512 A1 | 8/2017 | Williams et al. |
| 2017/0242653 A1* | 8/2017 | Lang ..................... H04R 3/00 |
| 2017/0243576 A1* | 8/2017 | Millington .............. G06F 3/165 |
| 2017/0279426 A1 | 9/2017 | Dizon et al. |
| 2018/0004372 A1 | 1/2018 | Zurek et al. |
| 2018/0018967 A1 | 1/2018 | Lang et al. |
| 2019/0102145 A1* | 4/2019 | Wilberding ......... G06F 3/04817 |
| 2019/0243606 A1 | 8/2019 | Jayakumar et al. |

OTHER PUBLICATIONS

Office Action for U.S. Appl. No. 16/222,751, dated Aug. 1, 2019, Jayakumar, "Audio Output Control", 11 pages.
The PCT Search Report dated Apr. 25, 2019, for PCT Application No. PCT/US2019/016690, 13 pages.

* cited by examiner

AUDIO OUTPUT CONTROL

RELATED APPLICATIONS

This application claims priority to and is a continuation of U.S. patent application Ser. No. 16/222,751, filed on Dec. 17, 2018, which is a continuation of U.S. patent application Ser. No. 15/889,754 (now U.S. Pat. No. 10,157,042), filed on Feb. 6, 2018, the entire contents of which are incorporated herein by reference.

BACKGROUND

Environments may have multiple audio output devices, such as speakers. In some instances, those speakers can output the same audio. Described herein are improvements in technology and solutions to technical problems that can be used to, among other things, provide alternative means to control audio output via multiple devices in an environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
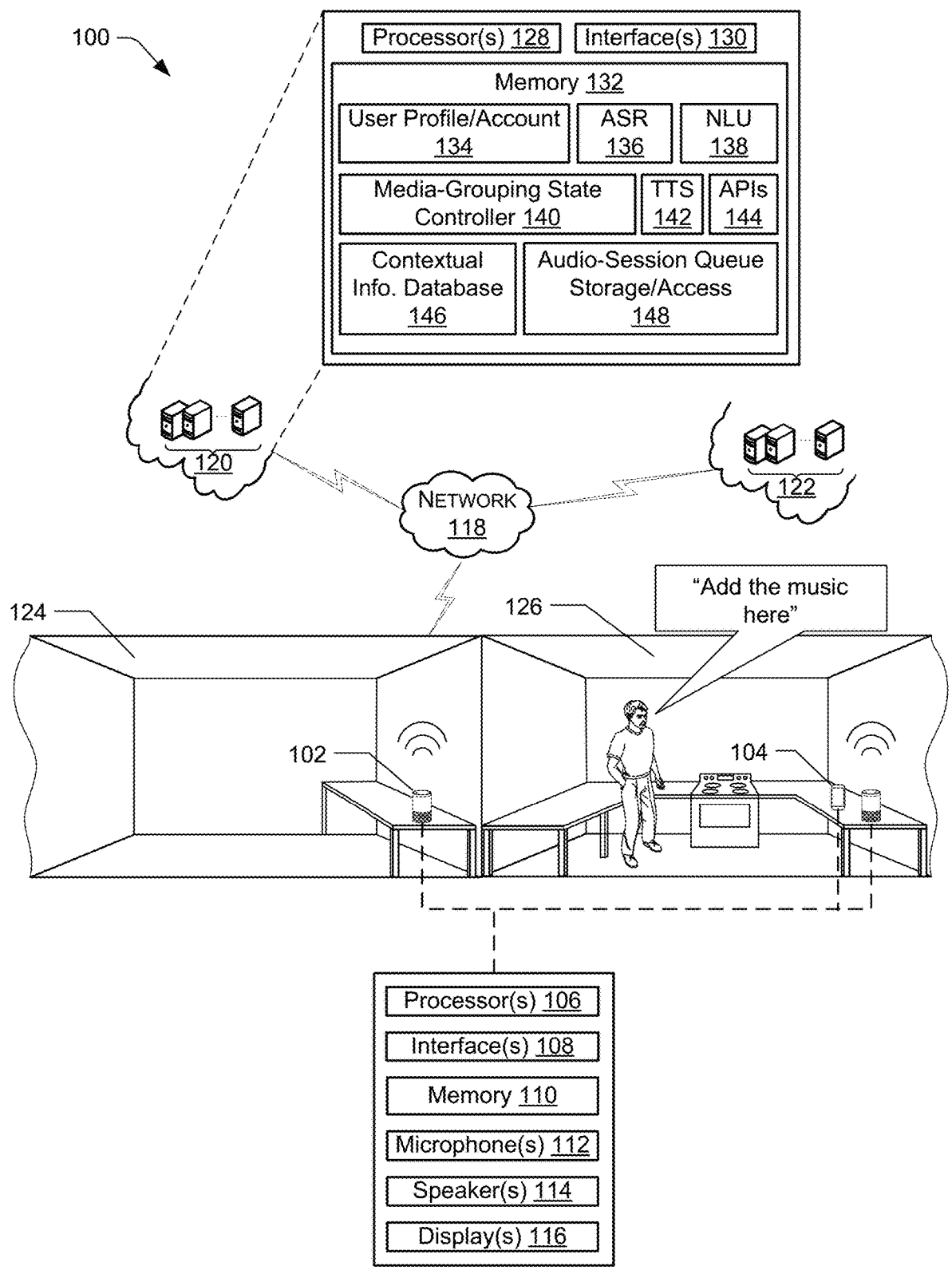
FIG. 1 illustrates a schematic diagram of an example environment for audio output control.

Systems and methods for audio output control are described herein. Take, for example, an environment, such as a home, that has multiple audio-output devices. The audio-output devices may be speakers that may be positioned around the environment at different locations. For example, one device may be positioned in the kitchen, another in the bedroom, and another in the basement. The devices may be associated with each other based at least in part on, for example, the devices being manufactured by the same company, the devices being associated with a user profile and/or user account, the devices operate via the same speech-processing system, and/or the devices being associated with an application residing on and/or accessible by a personal device, such as a mobile phone, tablet, and/or other computing device. In examples, the devices may output differing audio such that the kitchen device outputs a first song, the bedroom device outputs a second song, and/or the basement device outputs a third song. In other examples, a user may desire to have multiple devices output the same audio (e.g., in a time-synchronized fashion, such that the audio data is outputted by multiple devices within milliseconds (less than 10 ms, 20 ms, etc.) of each other). For example, the user may desire the kitchen device and the bedroom device to output the same song at the same time. To achieve this functionality, the user may provide tactile input via the application associated with the personal device, if the application includes such functionality. However, the user may desire to achieve this functionality and/or other functionality such as adding devices to output audio, moving audio to a different device, and/or ceasing output of audio on one or more of the devices via voice commands.

To address these shortcomings, the present disclosure describes example systems and methods for improved audio output control. Continuing with the example provided above, a user may be located in the kitchen and may provide a user utterance to the kitchen device to output audio corresponding to a given artist. One or more microphones of the kitchen device may capture audio corresponding to the user utterance and generate corresponding audio data to be sent to a remote system for processing. The remote system may determine intent data corresponding to the audio data. The intent data may represent an intent to output the desired audio. The remote system may send directive data to the kitchen device, which may cause the kitchen device to output the requested audio. An audio-session queue may be identified, determined, and/or generated that represents a listing of audio data and/or files, such as songs, to be utilized during the audio session. The audio-session queue may be associated with the kitchen device.

The user may then desire to have another device, such as the basement device, output the audio while continuing to output the audio via the kitchen device, or to move the audio to the basement device instead of the kitchen device, or to cease output of audio on one of the devices while continuing to output the audio on one or more of the other devices. To do this, for example, the user may provide a second user utterance to any of the devices in the environment. Audio data corresponding to the user utterance may be generated and sent to the remote system, which may determine the intent to add, move, and/or remove a device from the audio session. In other examples, instead of audio data, input data, such as from input on a mobile device executing an application thereon, may be generated and sent to the remote system.

In the example where the user requests to add a device to the audio session, such as via a user utterance like "Alexa, play the music in the basement too," the state of the basement device may be associated with the state of the device currently outputting the audio, say the kitchen device.

In this way, operations performed via the kitchen device may also be performed via the basement device. By so doing, the kitchen device may act as a hub device and may cause the other associated devices to perform similar operations as the kitchen device. Additionally, the audio-session queue associated with the kitchen device may be associated with both the kitchen device and the basement device such that both the kitchen device and the basement device are provided access to the audio-session queue. In examples, before the kitchen device and the basement device are associated with the audio-session queue, the kitchen device may be dissociated from the audio-session queue. Based at least in part on the audio-session queue being associated with the kitchen device and the basement device, both the kitchen device and the basement device may output the requested audio. Data representing the association of the audio-session queue and/or the shared state of the kitchen device and the basement device may be sent to mobile device such that the application residing on and/or accessible by the mobile device may present the current status of audio output via the devices.

In another example where the user requests to output audio from another device instead of the device currently output the audio, such as via a user utterance like "Alexa, move the music to the basement," the state of the basement device may be associated with the state of the device currently outputting the audio. The state of the device currently outputting the audio may then be dissociated from the state of the basement device. Additionally, the audio-session queue associated with the first device may be associated with the basement device and dissociated from the first device. Based at least in part on the audio-session queue being associated with the basement device, the basement device may output the audio while output of the audio may cease on the first device. Data representing the association of the audio-session queue and/or the change of state of the basement and/or kitchen devices may be sent to the mobile device such that the application residing on and/or accessible by the mobile device may present the current status of the audio output via the device.

In another example where the user requests to cease output of audio from one of multiple devices outputting audio, such as via a user utterance like "Alexa, stop music in kitchen," the state of the kitchen device may be dissociated from the state of the other device outputting the audio. Additionally, the audio-session queue associated with the kitchen device may be dissociated from the kitchen device. Based at least in part on the audio-session queue being dissociated from the kitchen device, output of the audio may cease on the kitchen device. If the kitchen device was the hub device, one of the other devices outputting the audio may be selected as the hub device. Data representing the dissociation of the audio-session queue and/or the change of state of the kitchen device may be sent to the mobile device such that the application residing on and/or accessible by the mobile device may present the current status of the audio output via the devices.

Utilizing user utterances to add devices, move audio to different devices, and/or cease output of audio on certain devices may be performed without creating group identifiers when multiple devices are associated to output audio. For example, an audio-session queue may typically be associated with a device or a device group with a single identifier. Each time devices in the group change, such as by being removed or added, a new group and corresponding group identifier is generated. Generation of a new group for each group change adds latency and leads to challenges when trying to seamlessly start and/or stop audio output on multiple device. The techniques described herein do not generate a new group for each device grouping, but instead maintain devices separately and associate device states and audio-session queues as described herein, leading to decreased latency between user utterance and performance of a corresponding action, and allows for audio to be started and stopped on multiple devices via user utterances received from some or all of the devices.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for audio output control. The system 100 may include, for example, one or more communal devices 102, such as voice-assistant devices and/or other computing devices, and one or more personal devices 104, such as a mobile device. The communal devices 102 may be associated with an environment, such as a home or place of business. In examples, the communal devices 102 may each be associated with their own location within an environment. By way of example, a first communal device 102 may be situated in one room while a second communal device 102 may be situated in another room. Additionally, or alternatively, the personal device 104 may be associated with the one or more communal devices 102 and/or one or more users residing in the environment. The communal devices 102 may include various computing components, such as one or more processors 106, one or more network interfaces 108, memory 110, one or more microphones 112, one or more speakers 114, and/or one or more displays 116.

In examples, the communal devices 102 may include each of the components described above. In these examples, the communal devices 102 may be configured to capture audio, such as a user utterance, via the microphones 112 and generate corresponding audio data. This audio data may be sent via one or more networks 118 to a remote system 120 and/or a third-party remote system 122 for processing. In other examples, the communal devices 102 may include only a portion of the components described above. For example, in examples where at least one of the communal devices 102 is a communal speaker, the communal device 102 may include the processors 106, the network interfaces 108, memory 110, and/or the speakers 114. In these examples, the communal device 102 may not be configured to capture audio, but instead, the personal device 104, or another communal device 102, may be configured to capture audio and generate corresponding audio data.

The memory 110 of the communal device(s) 102 and/or the personal device 104 may include instructions that, when executed by the one or more processors 106, may cause the one or more processors 106 to perform certain operations. For example, the operations may include sending the audio data representing a user utterance to the remote system 120, such as via the network 118. By way of example, the user utterance may represent a command to control the output of audio via one or more of the communal devices 102. For example, audio may be output via a first communal device 102. The user may desire to alter the audio of the audio on the first communal device 102, such as by stopping the audio from being output, and/or the user may desire to output the audio on a second communal device 102 associated with the first communal device 102. For example, as shown in FIG. 1, the user may be located in a first environment 124, that contains the personal device 104 and a communal device 102. Additionally, another communal device 102 may be situated in a second environment 126. The first communal device 102 may be outputting audio, such as a song, via the one or more speakers 114. The user may speak a user utterance associated with controlling the output of the audio. For example, the user may say "Alexa, add the music to the kitchen," and/or "Alexa, move the music to the kitchen," and/or "Alexa, stop the music in the kitchen."

The microphone(s) 112 of the personal device 104 and/or the communal device 102 may capture the user utterance and generate corresponding audio data. The audio data may be sent, via the network 118 and using the network interface(s) 108, to the remote system 120 for processing. The personal device 104 and/or the communal device 102 may receive, from the remote system 120 and via the network 118 and network interface(s) 108, directive data representing a directive for the first communal device 102 and/or the second communal device 102 to perform an action based at least in part on the user utterance. For example, the directive may be for the audio being output by the first communal device 102 to be output by the second communal device 102 simultaneously, or near simultaneously, with the audio output by the first communal device 102. An example of this would be that the first communal device 102 is outputting a song. Based at least in part on the user utterance requesting that the song be output by a second communal device 102, the song may also be output by the second communal device 102 such that both communal devices 102 are outputting the same song at the same or nearly the same time. By way of further example, the directive may be for the audio being output by the first communal device 102 to cease being output by the first communal device 102 and to be output instead by the second communal device 102. Sticking with the song example used herein, based at least in part on the user utterance requesting that the song be moved from the first communal device 102 to the second communal device 102, the song may be output by the second communal device 102 and the song may cease being output by the first communal device 102. By way of further example, the directive may be for the audio being output by the first communal device 102 and the second communal device 102 to cease being output by one of the communal devices 102. Based at least in part on the user utterance requesting that the song cease being output by one of multiple communal devices 102, the song may cease being output on the requested communal device 102 while the other communal device 102 may continue outputting the song.

Additionally, or alternatively, data indicating a state of the communal devices 102 may be sent to the personal device 104 and may cause indicators of the states of the devices to be displayed, such as via the display(s) 116, on the personal device 104. For example, an application may reside on, such as in the memory 110, and/or be accessible by the personal device 104. The application may provide for tactile control of the communal devices 102 and/or may provide information about the states of the communal devices 102. For example, the states of the communal devices 102 may include outputting audio and not outputting audio. The data displayed on the personal device 104 may additionally, or alternatively, include information associated with the audio being output by one or more of the communal devices 102. For example, a naming indicator associated with the audio, such as a song name, album name, artist name, and/or other identifying information may be presented on the display 116. Additionally, or alternatively, naming indicators associated with the communal devices 102 may also be displayed. The naming indicators may be provided by a user, such as during setup of the application and/or the communal devices 102. The naming indicators may, for example, provide an indication of the location of the communal devices 102 within an environment. For example, a communal device 102 located in the kitchen of a home may be labeled as and/or identified as the "kitchen" communal device 102.

Additionally, or alternatively, the data indicating the state of the communal devices 102 and/or the information associated with the audio being output by one or more of the communal devices 102 may be utilized by the personal device 104 and/or the communal device 102 to respond to a user query. For example, the user may provide a user utterance representing a request for information about the state of one or more of the communal devices 102 and/or for information about the audio being output. For example, a user may say "Alexa, what song is being played in the kitchen?" The data may indicate that the state of the kitchen device is outputting audio corresponding to a given audio-session queue, and the identify of the current song being output. A text-to-speech component 142 of the remote system 120 may generate audio data representing a response to the user utterance to be output by the speaker(s) 114 of the personal device 104 and/or the communal device 102.

The remote system 120 of the system 100 may include one or more computing components, such as, for example, one or more processors 128, one or more network interfaces 130, and memory 132. The memory 132 of the remote system 120 may include one or more components, such as, for example, a user profile/account component 134, an automatic speech recognition (ASR) component 136, a natural language understanding (NLU) component 138, a media-grouping state controller 140, a text-to-speech (TTS) component 142, one or more application programming interfaces (APIs) 144, a contextual information database 146, and/or an audio-session queue storage/access component 148. Each of these components will be described in detail below.

The user profiles/accounts component 134 may be configured to identify, determine, and/or generate associations between users, user profiles, user accounts, and/or devices. For example, one or more associations between personal devices 104, communal devices 102, environments, networks 118, users, user profiles, and/or user accounts may be identified, determined, and/or generated by the user profile/account components 134. The user profile/account component 134 may additionally store information indicating one or more applications accessible to the personal device 104 and/or the communal devices 102. It should be understood that the personal device 104 may be associated with one or more other personal devices 104, one or more of the communal devices 102, one or more environments, one or more applications stored on and/or accessible by the personal device 104, and/or one or more users. It should also be understood that that a user account may be associated with one or more than one user profile. For example, a given personal device 104 may be associated with a user account and/or user profile that is also associated with the communal devices 102 associated with an environment. The personal device 104, the communal device 102, the user profile, and/or the user account may be associated with one or more applications, which may have their own user profiles and/or user accounts, that provide access to audio data, such as songs.

The ASR component 136 may be configured to receive audio data, which may represent human speech such as user utterances, and generate text data corresponding to the audio data. The text data may include words corresponding to the human speech. The NLU component 138 may be configured to determine one or more intents associated with the human speech based at least in part on the text data. The ASR component 136 and the NLU component 138 are described in more detail below with respect to FIG. 12. For purposes of illustration, the ASR component 136 and the NLU component 138 may be utilized to determine one or more intents to control audio output on one or more communal devices 102.

For example, a user may provide a user utterance to add a communal device 102 to an audio output session, to move an audio output session to another communal device 102, and/or to cease output of audio on one of multiple communal devices 102. Audio data corresponding to the user utterance may be received by the remote system 120. The ASR component 136 may process the audio data and generate corresponding text data. The NLU component 138 may utilize the text data to determine intent data representing an intent of the user to, in these examples, add, move, or remove communal devices 102 from an audio session.

The media-grouping state controller 140 may be configured to control the states of communal devices 102. For example, each communal device 102 may be associated with a state. The state of the communal device 102 may be, for example, an audio-output state where the communal device 102 is currently outputting audio and/or an inactive state where the communal device 102 is not currently outputting audio. Additionally, when multiple communal devices 102 are outputting different audio, such as when a first communal device 102 is outputting a first song and a second communal device 102 is outputting a second song, each of the communal devices 102 may be associated with a different audio-output state. The media-grouping state controller 140 may be further configured to identify and/or determine the state of one or more of the communal devices 102. Based at least in part on receiving a user utterance to control audio output on the communal devices 102, the media-grouping state controller 140 may cause control data to be spent to one or more of the communal devices 102 to change the state of those communal devices 102. Data from the third-party remote system 122 may additionally, or alternatively, inform the identification and/or determination of the state of communal devices 102.

For example, a first communal device 102 may be currently outputting audio associated with an audio-session queue. Based at least in part on the first communal device 102 currently outputting audio, the media-grouping state controller 140 may identify and/or determine that the first communal device 102 is associated with a first audio-output state. A second communal device 102 that is associated with the first communal device 102 may not be currently outputting audio. Based at least in part on the second communal device 102 not outputting audio, the media-grouping state controller 140 may identify and/or determine that the second communal device 102 is associated with an inactive state.

The media-grouping state controller 140 may also receive data from, for example, the NLU component 138 indicating that the user desires to act with respect to output of the audio. For example, the NLU component 138 may determine that the user utterance corresponds to an intent to output the audio on the second communal device 102 in addition to the first communal device 102, or otherwise to add the second communal device 102 to the audio session. The media-grouping state controller 140 may, based at least in part on information provided by the NLU component 138, cause the inactive state of the second communal device 102 to change to the audio-output state of the first communal device 102. In this example, actions taken by the first communal device 102 may also be taken by the second communal device 102, such as, for example, outputting the audio, accessing audio-session queues, and/or controlling audio output volumes.

By way of further example, the NLU component 138 may determine that the user utterance corresponds to an intent to output the audio on the second communal device 102 instead of the first communal device 102, or otherwise to move the audio session from the first communal device 102 to the second communal device. The media-grouping state controller 140 may, based at least in part on information provided by the NLU component 138, cause the inactive state of the second communal device 102 to change to the audio-output state of the first communal device 102. Additionally, the media-grouping state controller 140 may cause the audio-output state of the first communal device 102 to change to an inactive state, which may be the same state as the second communal device 102 before the user utterance was received, or to a different inactive state. In this example, actions taken by the first communal device 102 may not be taken by the second communal device 102, and/or actions taken by the second communal device 102 may not be taken by the first communal device 102.

By way of further example, the NLU component 138 may determine that the user utterance corresponds to an intent to cease output of the audio on the first communal device 102 but to continue outputting the audio on the second communal device 102, or otherwise to remove the first communal device 102 from the audio session. The media-grouping state controller 140 may, based at least in part on information provided by the NLU component 138, cause the audio-output state of the first communal device 102 to change to an inactive state while maintaining the audio-output state of the second communal device 102. In this example, actions taken by the first communal device 102 may not be taken by the second communal device 102, and/or actions taken by the second communal device 102 may not be taken by the first communal device 102.

The media-grouping state controller 140 may also be configured to cause a communal device 102 of multiple associated communal devices 102 to act as a hub device. The hub device may control the other communal devices 102 not designated as a hub device. In these examples, data may flow from the non-hub devices to the hub device, which may communicate on behalf of the hub device and the non-hub devices with the remote system 120 and/or the third-party remote system 122. Selection of the hub device is described in more detail with respect to FIG. 8, below.

In examples, the media-grouping state controller may be a component of a device management component, which is described in detail with respect to FIG. 13, below.

The TTS component 142 may be configured to generate audio data to be utilized by one or more of the communal devices 102 and/or the personal devices 104 to output audio in the form of synthesized or prerecorded speech. For example, a user may provide an audible query to the personal device 104 and/or the communal device 102. The microphones 112 of the personal device 104 and/or the communal device 102 may capture the user utterance and generate corresponding audio data that is sent to the remote system. The ASR component 136 may generate corresponding text data and the NLU component 138 may determine, using the text data, intent data representing an intent by the user to acquire information, such as information associated with the audio being output by the communal device 102. One or more speechlets associated with providing the information may receive the intent data and may determine a response to provide to the user. The TTS component 142 may take text data corresponding to the response and may generate audio data corresponding to the text data. The audio data may be sent to the personal device 104 and/or one or more of the communal devices 102 for output of audio corresponding to the audio data.

By way of example, the user may be near a first communal device 102 located, for example, in a bedroom, and may say "Alexa, what's playing in the kitchen?" Corresponding audio data may be sent to the remote system 120. Text data corresponding to the request may be generated by the ASR component 136 and the NLU component 138 may determine intent data representing the intent of determining identifying information associated with audio being output by the communal device 102 located in and/or associated with the kitchen. Text data representing the identifying information may be generated and/or identified and may be utilized by the TTS component 142 to generate audio data representing a response, which may include the identifying information. The audio data may be sent to the communal device 102 that generated the audio data and the speakers 114 of the communal device 102 may output audio corresponding to the audio data in response to the user utterance.

The APIs 144 may include one or more APIs configured to support communication of data and performance of operations between the personal device 104, the communal devices 102, the remote system 120, and the third-party remote system 122. For example, communication of events associated with control of audio output on the communal devices 102 may be performed via the APIs 144. In situations where the user utterance corresponds to an intent to add a communal device 102 to the audio session, directive data associated with this intent may be sent, via an API, to the third-party remote system 122. The directive data may indicate the communal device 102 to be added to the audio session. The third-party remote system 122 may associate the communal device 102 currently outputting audio with the added communal device 102. In situations where the user utterance corresponds to an intent to move the output of audio from one communal device 102 to another communal device 102, directive data associated with this intent may be sent, via an API 144, to the third-party remote system 122. The directive data may indicate the communal device 102 be added to the audio session and the communal device 102 to be removed from the audio session. The third-party remote system 122 may associate the communal device 102 currently outputting audio with the added communal device 102 and may dissociate the first communal device 102 from the audio session. In situations where the user utterance corresponds to an intent to remove a communal device from an audio session, directive data associated with this intent may be sent, via an API 144, to the third-party remote system 122. The directive data may indicate the communal device 102 to be removed from the audio session. The third-party remote system 122 may dissociate the requested communal device 102 from the audio session.

The APIs 144 may be provided by the third-party remote system 122 and/or the APIs 144 may be identified, determined, and/or generated by the remote system 120. The APIs 144 may be utilized for multiple third parties providing access to audio files, and/or the APIs 144 may be specific to the third party providing access to the audio files, and/or the third party that manufacturers one or more of the communal devices 102, and/or the third party that develops the audio-output application stored on and/or accessed by the personal device 104.

The contextual information database 146 may be configured to identify, determine, and/or generate contextual information associated with the user profiles, the user accounts, the personal device 104, the communal devices 102, and/or audio data representing user utterances to control audio output. For example, the contextual information may include information about which device audio corresponding to user utterances is captured by, which communal devices 102 are currently outputting audio and what audio is currently being output, previous audio-output requests, amounts of time between requests, the time of day a request is made, and/or user-specific behavior associated with requests.

For example, the contextual information about which device audio corresponding to a user utterance is captured may be utilized to inform a determination, such as by the NLU component 138, of what audio is associated with an intent to add, move, and/or remove a communal device 102 from an audio session. For example, a user utterance may be "Alexa, play this in the kitchen." In this example, the word "this" is an anaphora. Based at least in part on contextual information identifying audio being output by a communal device 102 from which the user utterance was captured, the remote system 120 may determine that "this" corresponds to the audio currently being output by the communal device 102.

By way for further example, a user utterance may be "Alexa, play the music here." In this example, the word "here" is an anaphora. Based at least in part on contextual information identifying the communal device 102 that captured the user utterance, the remote system 120 may determine that "here" corresponds to the communal device 102 that captured the audio and/or that generated the audio data. Based at least in part on this determination, the state of the communal device 102 may be transitioned to the state of at least one other communal device 102 that is outputting "the music," and the audio session associated with the at least one other communal device 102 may be associated with the communal device 102 that captured the user utterance. Additionally, or alternatively, the communal device 102 that was outputting the audio may be dissociated from the audio session and/or the state of the communal device 102 may be transitioned to an inactive or other state. This example may be utilized when the user utterance signifies an intent to move the audio session to another communal device 102 as opposed to adding that communal device 102 to the audio session. In other examples, a user utterance of "Alexa, play the music here also" may signify an intent to add a communal device 102 instead of moving the audio session from one communal device 102 to another communal device 102.

By way of further example, contextual information indicating a timing of a user utterance with respect to a previous user utterance and/or a time of day of the user utterance may be utilized to disambiguate intents and control audio content on multiple communal devices 102. For example, if an audio session is being output by multiple communal devices 102, a user utterance of "Alexa, stop," may result in each of the communal devices 102 ceasing output of the audio data. A subsequent user utterance received within a threshold amount of time from the "stop" request may result in the requested action being performed by each of the communal devices 102. In other examples, a user utterance received after a threshold amount of time, or received, for example, the next day, may result in only the communal device 102 that captured the user utterance performing the action. In this way, an anaphora of a user utterance may be interpreted to accurately determine how to control audio output on multiple associated communal devices 102, and one or more intents may be inferred.

The audio-session queue storage/access component 148 may be configured to store and/or access an audio-session queue and/or information associated with an audio-session queue. For example, an audio-session queue may be identified, determined, and/or generated based at least in part on a user's request to output audio. For example, a user request to output songs from the Moana soundtrack may result in the identification, determination, and/or generation of an audio-session queue corresponding to the songs on the Moana soundtrack. This audio-session queue may be associated with the communal device 102 from which the request to output audio was received. When subsequent user utterances are received that represent requests to add communal devices 102, move audio sessions to communal devices 102, and/or remove communal devices 102 from audio sessions, the audio-session queue storage/access component 148 may associate audio with the communal devices 102 to effectuate the intended audio output by the communal devices 102.

As used herein, a processor, such as processor(s) 106 and 128, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 106 and 128 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 106 and 128 may possess its own local memory, which also may store program components, program data, and/or one or more operating systems.

The memory 110 and 132 may include volatile and nonvolatile memory, removable and non-removable media implemented in any method or technology for storage of information, such as computer-readable instructions, data structures, program component, or other data. Such memory 110 and 132 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 110 and 132 may be implemented as computer-readable storage media ("CRSM"), which may be any available physical media accessible by the processor(s) 106 and 128 to execute instructions stored on the memory 110 and 132. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 110 and 132, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 108 and 130 may enable communications between the components and/or devices shown in system 100 and/or with one or more other remote systems, as well as other networked devices. Such network interface(s) 108 and 130 may include one or more network interface controllers (NICs) or other types of transceiver devices to send and receive communications over the network 118.

For instance, each of the network interface(s) 108 and 130 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 108 and 130 may include a wide area network (WAN) component to enable communication over a wide area network.

In some instances, the remote system 120 may be local to an environment associated the personal device 104 and/or one or more of the communal devices. For instance, the remote system 120 may be located within the personal device 104 and/or one or more of the communal devices 102. In some instances, some or all of the functionality of the remote system 120 may be performed by one or more of the personal device 104 and/or one or more of the communal devices 102.

Figure 2:
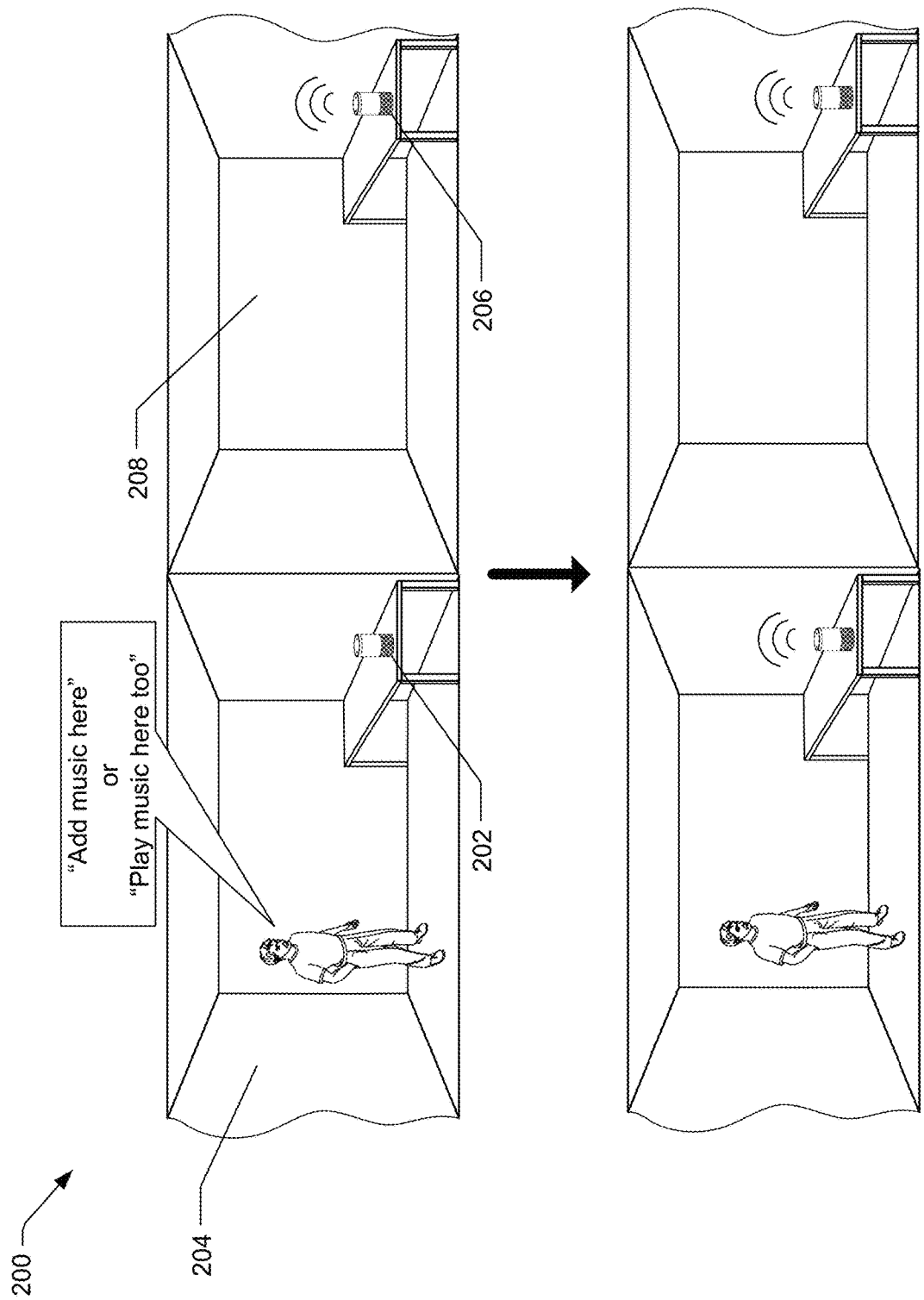
FIG. 2 illustrates a schematic diagram of an example environment for causing an additional device to output audio.

FIG. 2 illustrates a schematic diagram of an example environment 200 for causing an additional device to output audio. FIG. 2 depicts a progression, from top to bottom, of the output of audio via multiple devices in the environment 200. The environment 200 may include a first communal device 202 situated in a first portion 204 of the environment 200 and a second communal device 206 situated in a second portion 208 of the environment 200. In the example of FIG.

2, a user may be situated in the first portion 204 of the environment 200. The user may speak a user utterance. In this example, the user utterance is "Add music here" or "Play music here too." One or more microphones of the first communal device 202 may capture audio corresponding to the user utterance and may generate corresponding audio data. The audio data may be sent to a remote system for speech processing. For example, the remote system may perform automatic speech recognition and natural language understanding techniques to determine an intent associated with the user utterance. The use of automatic speech recognition and natural language understanding techniques are described in more detail with respect to FIG. 12 below. In the example of FIG. 2, the remote system may determine that the user utterance corresponds to an intent to output audio.

In this example, the user utterance includes the anaphora "here." Based at least in part on contextual information indicating that the user utterance was captured by the first communal device 202, "here" may be associated with an intent to output the "music" on the first communal device 202. Based at least in part on determining that the user utterance corresponds to an intent to output music being output by an associated communal device, such as the second communal device 206, the remote system may identify a source device, which may be the communal device currently outputting the audio, which, in this example, is the second communal device 206. A state controller of the remote system may change the state of the first communal device 202 to be the same or similar to the state of the second communal device 206 based at least in part on determining that the user utterance corresponds to the intent to output music on the first communal device 202 along with outputting the music on the second communal device 206. Additionally, the audio-session queue associated with the second communal device 206 may be associated with the first communal device 202. In this way, in response to the user utterance, the first communal device 202 and the second communal device 206 may output the same audio in both the first portion 204 and the second portion 206 of the environment 200. Data indicating the audio-output status of the first communal device 202 and the second communal device 206 may be sent to the communal devices, a personal device associated with the communal devices, and/or a third-party remote system. This data may be utilized to provide a visual and/or audible indication of the audio-output status of the communal devices, such as in response to a query for status information from the user.

Figure 3:
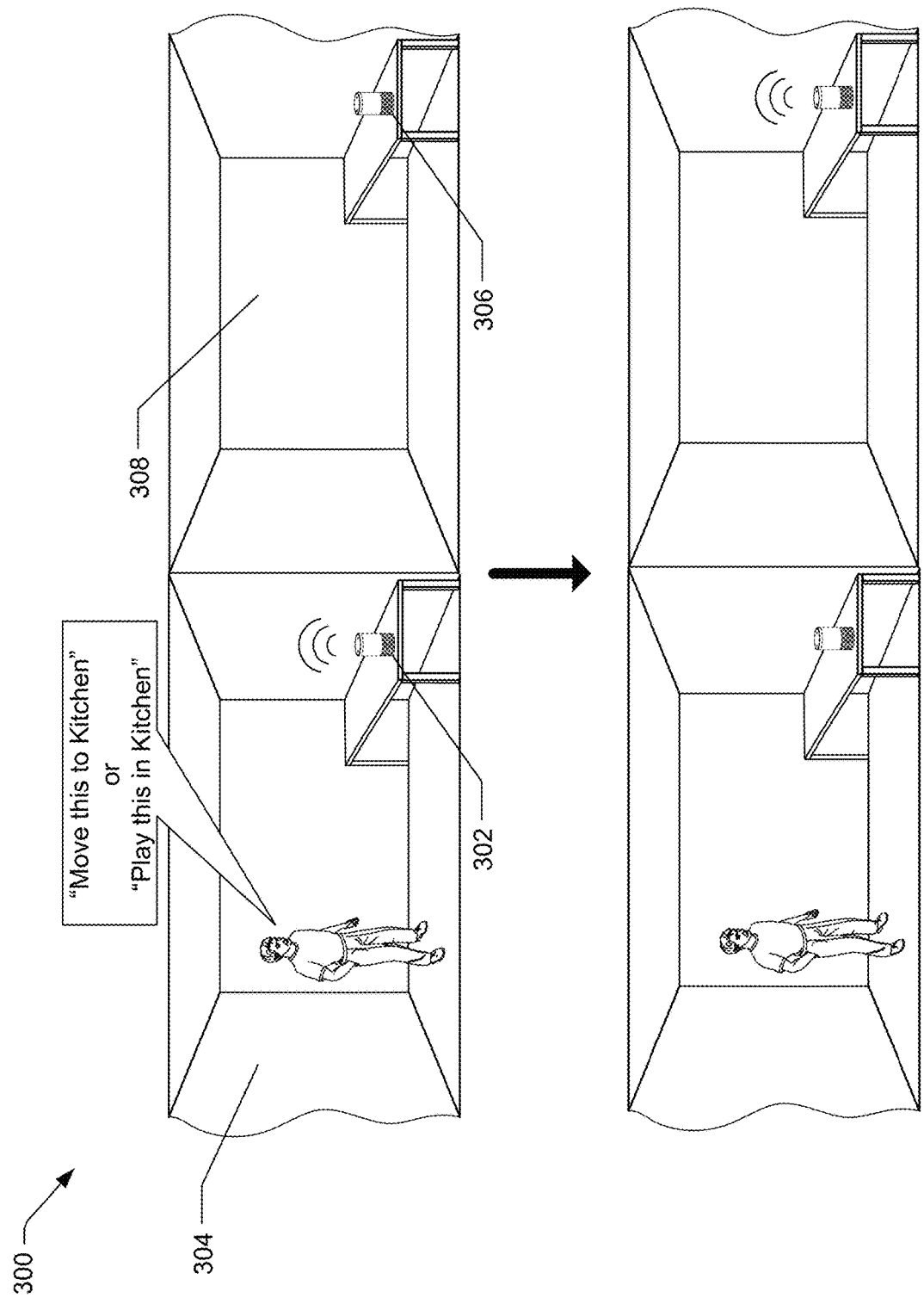
FIG. 3 illustrates a schematic diagram of an example environment for moving output of audio from a first device to a second device.

FIG. 3 illustrates a schematic diagram of an example environment 300 for moving output of audio from a first device to a second device. FIG. 3 depicts a progression, from top to bottom, of the output of audio via multiple devices in the environment 300. The environment 300 may include a first communal device 302 situated in a first portion 304 of the environment 300 and a second communal device 306 situated in a second portion 308 of the environment 300. In the example of FIG. 3, a user may be situated in the first portion 304 of the environment 300. The user may speak a user utterance. In this example, the user utterance is "Move this to kitchen" or "Play this in kitchen." One or more microphones of the first communal device 302 may capture audio corresponding to the user utterance and may generate corresponding audio data. The audio data may be sent to a remote system for speech processing. For example, the remote system may perform automatic speech recognition and natural language understanding techniques to determine an intent associated with the user utterance. The use of automatic speech recognition and natural language understanding techniques are described in more detail with respect to FIG. 12 below. In the example of FIG. 3, the remote system may determine that the user utterance corresponds to an intent to output audio.

In this example, the user utterance includes the anaphora "this." Based at least in part on contextual information indicating at least one of the first communal device 302 or the second communal device 306 is currently outputting audio, "this" may be associated with an intent to output the audio currently being output on the second communal device 306. Additionally, at least a portion of the intent may be inferred from the user utterance. For example, for the user utterance of "play this in kitchen," an intent associated with outputting audio via the communal device associated with the kitchen and ceasing output on the communal devices that captured the user utterance may be determined. However, in instances where the user utterance includes an indication that the intent is to add a communal device instead of moving the audio session to a different communal device, such as when the words "too," "also," "add," and/or "as well" are used, the output may continue to be output via the communal device that captured the user utterance.

Based at least in part on determining that the user utterance corresponds to an intent to move output of the audio from the first communal device 302 to the second communal device 306, the remote system may identify a source device, which may be the first communal device 302 in this example. A state controller of the remote system may change the state of the second communal device 306 to be the same as or similar to the state of the first communal device 302 based at least in part on determining that the user utterance corresponds to the intent to output music on the second communal device 306 instead of outputting the music on the first communal device 302. Additionally, the audio-session queue associated with the first communal device 302 may be associated with the second communal device 306, and may be dissociated with the first communal device 302. In this way, in response to the user utterance, the second communal device 306 may output the audio instead of the first communal device 302. Data indicating the audio-output status of the first communal device 302 and the second communal device 306 may be sent to the communal devices, a personal device associated with the communal devices, and/or a third-party remote system. This data may be utilized to provide a visual and/or audible indication of the audio-output status of the communal devices, such as in response to a query for status information from the user.

Figure 4:
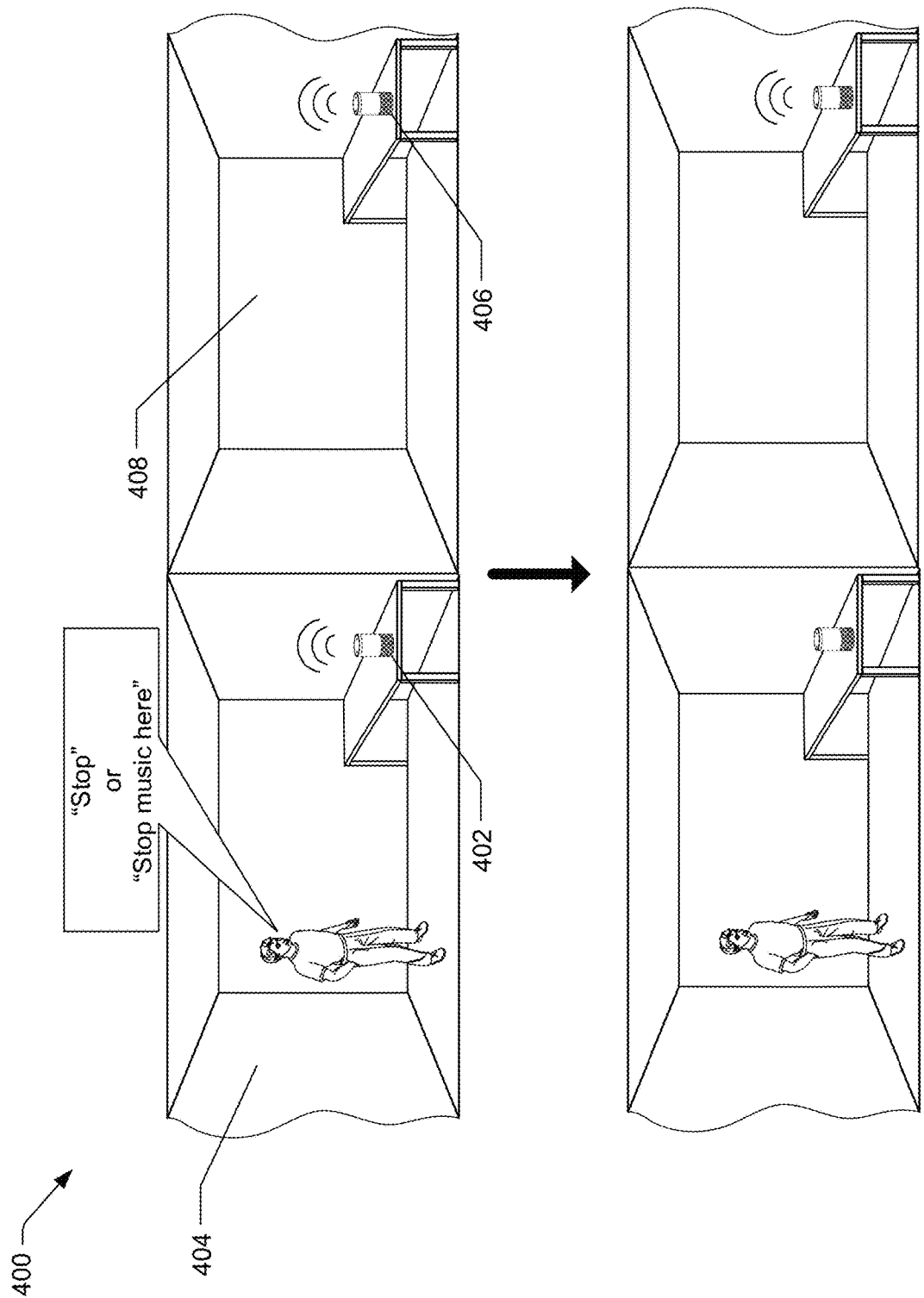
FIG. 4 illustrates a schematic diagram of an example environment for causing one of multiple devices to cease output of audio.

FIG. 4 illustrates a schematic diagram of an example environment 400 for causing one of multiple devices to cease output of audio. FIG. 4 depicts a progression, from top to bottom, of the output of audio via multiple devices in the environment 400. The environment 400 may include a first communal device 402 situated in a first portion 404 of the environment 400 and a second communal device 406 situated in a second portion 408 of the environment 400. In the example of FIG. 4, a user may be situated in the first portion 404 of the environment 400. The user may speak a user utterance. In this example, the user utterance is "stop," or "stop music here." One or more microphones of the first communal device 402 may capture audio corresponding to the user utterance and may generate corresponding audio data. The audio data may be sent to a remote system for speech processing. For example, the remote system may perform automatic speech recognition and natural language understanding techniques to determine an intent associated with the user utterance. The use of automatic speech recognition and natural language understanding techniques are described in more detail with respect to FIG. 12 below. In the example of FIG. 4, the remote system may determine that the user utterance corresponds to an intent to alter the output of audio.

In this example, the user utterance includes the anaphora "here." Based at least in part on contextual information indicating that the user utterance was captured by the first communal device 402, "here" may be associated with an intent to stop output of audio via the first communal device 402. Additionally, at least a portion of the intent may be inferred from the user utterance. For example, as shown in FIG. 4, both the first communal device 402 and the second communal device 406 are outputting audio. When the user utterance corresponds to an intent to cease output of audio, the user utterance may be further utilized to determine whether to cease output of audio on all communal devices currently outputting audio or just a portion of the communal devices. By way of example, the user utterance of "stop" or "stop music," may correspond to an intent to cease output of audio on all communal devices currently outputting audio in the environment 400. In other examples, the user utterance of "stop music here" or "stop here" or "stop music in the kitchen," may correspond to an intent to cease output of audio on a portion of the communal devices while continuing to output audio on other communal devices.

Based at least in part on determining that the user utterance corresponds to an intent to cease output of audio on the first communal device 402, the remote system may identify the first communal device 402 and may cause the first communal device 402 to cease output of the audio. A state controller of the remote system may change the state of the first communal device 402 to an inactive state or different state than the second communal device 406. Additionally, the audio-session queue may be dissociated from the first communal device 402. In this way, in response to the user utterance, the second communal device 406 may continue outputting the audio while the the first communal device 402 may cease output of the audio. Data indicating the audio-output status of the first communal device 402 and the second communal device 406 may be sent to the communal devices, a personal device associated with the communal devices, and/or a third-party remote system. This data may be utilized to provide a visual and/or audible indication of the audio-output status of the communal devices, such as in response to a query for status information from the user. By way of example, even when the first communal device 402 is not associated with the state of the second communal device 406 and/or an audio-session queue, the first communal device 402 may output a response to a request for status information associated with the second communal device 406.

Figure 5:
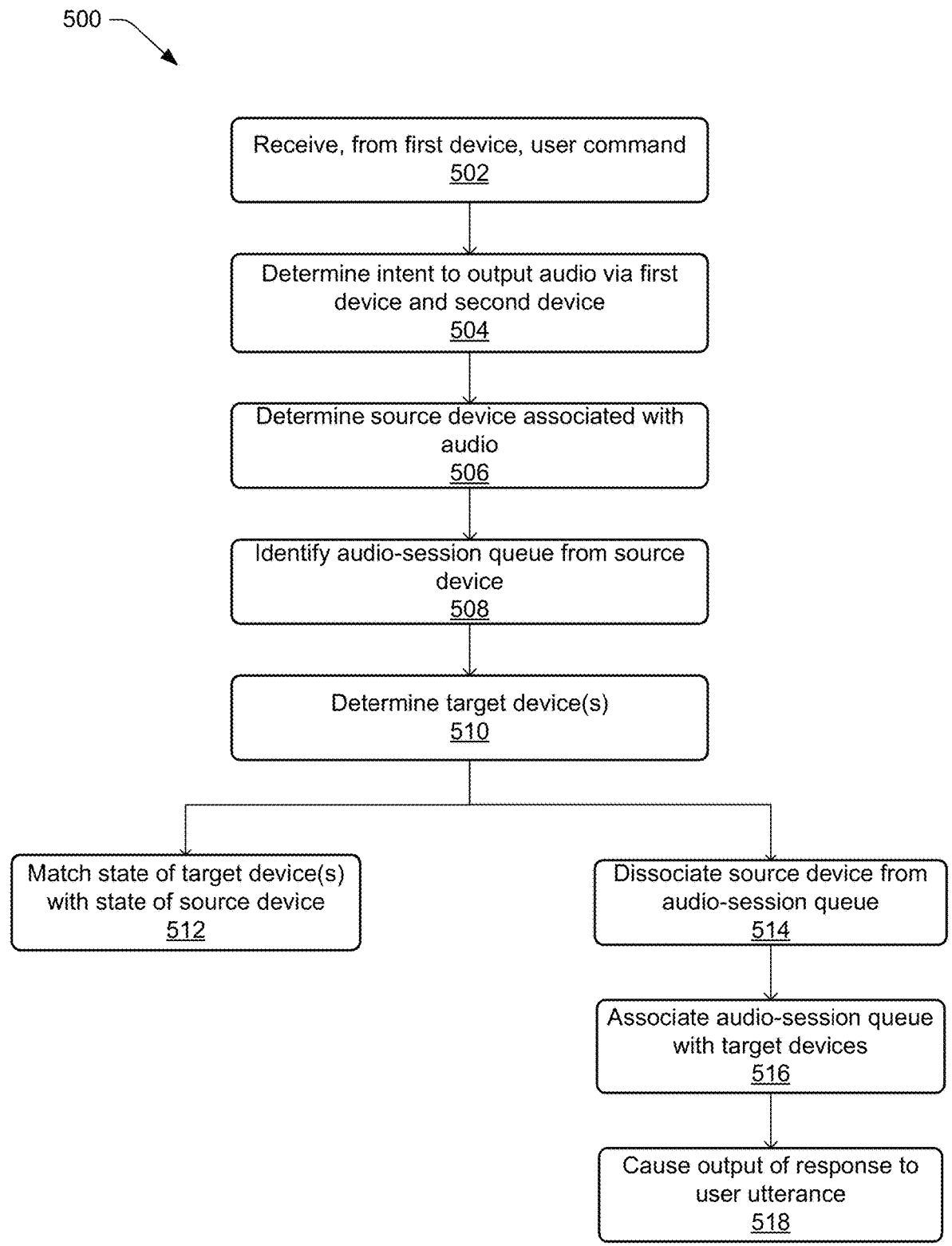
FIG. 5. illustrates a flow diagram of a process for causing an additional device to output audio.
Figure 6:
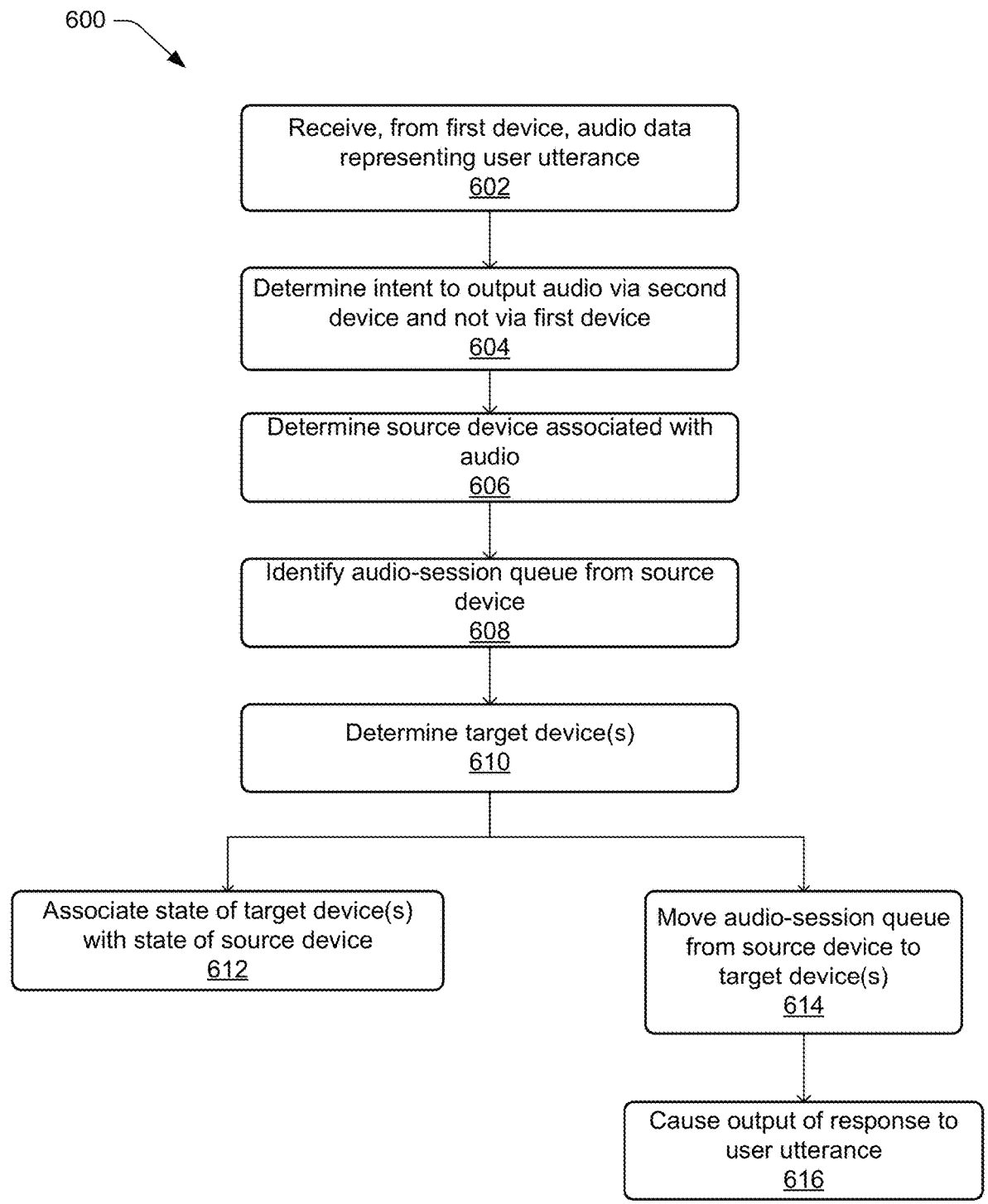
FIG. 6 illustrates a flow diagram of a process for moving output of audio from a first device to a second device.
Figure 7:
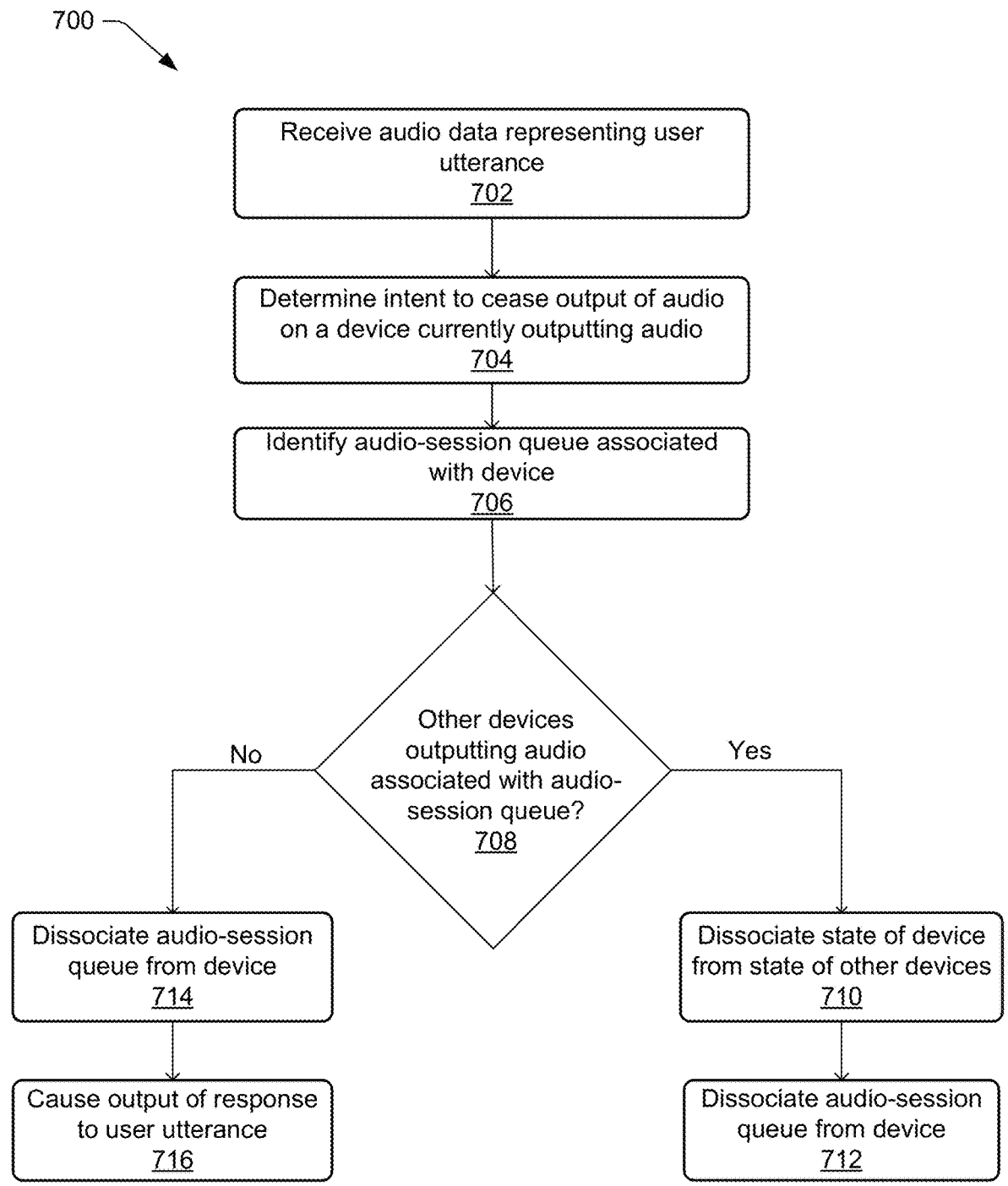
FIG. 7 illustrates a flow diagram of a process for causing one or multiple devices to cease output of audio.

FIGS. 5-7 illustrate various processes for audio content output control. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, 8, 12, and 13, although the processes may be implemented in a wide variety of other environments, architectures and systems.

FIG. 5. illustrates a flow diagram of a process for causing an additional device to output audio. The order in which the operations or steps are described is not intended to be construed as a limitation, and any number of the described operations may be combined in any order and/or in parallel to implement process 500.

At block 502, process 500 may include receiving, from a first device, a user command. In examples, the user command may be a user utterance, and audio data representing the user utterance may be received from the first device. In examples, the first device may be a communal device, such as the communal devices 102 described above with respect to FIG. 1. One or more microphones of the first device may capture audio representing the user utterance and may generate corresponding audio data. That audio data may be sent from the first device to a remote system, for example, and may be received at the remote system. In examples, the audio data may be received via an automatic speech recognition component, such as the automatic speech recognition component 136 described with respect to FIG. 12 below. The first device may be situated in a first portion of an environment and may be associated with one or more other devices situated in other portions of the environment. In other examples, the user command may be an input other than an audible input, such as a touch input and/or an instruction sent from another device, such as a personal device.

At block 504, the process 500 may include determining an intent to output audio via the first device and a second device. For example, automatic speech recognition techniques may be utilized to generate text data corresponding to the audio data. The text data may represent words determined from the audio data. Natural language understanding techniques may be utilized to generate intent data that may represent an intent determined from the text data. In examples, a natural language understanding component of the remote system, such as the natural language understanding component 138 described with respect to FIG. 12 below, may be utilized. In this example, the user utterance may be, for example, "add the music to the kitchen." In this example, the first device may be outputting audio corresponding to music. Based at least in part on the intent data, it may be determined that the user utterance corresponds to an "add" intent, which may represent an intent to output audio on a second device in addition to continuing to output audio on the first device.

At block 506, the process 500 may include determining a source device associated with the audio. For example, an audio-session queue may be associated with a device that is currently outputting audio. As described in this example, the first device may be currently outputting audio corresponding to music. An audio-session queue that indicates a queue of songs to be output by the first device may be associated with the first device based at least in part on the first device currently outputting the audio. In examples, an audio-session queue storage/access component, such as the audio-session queue storage/access component 134 described with respect to FIG. 1, may be utilized to determine the source device. It should be understood that while one device is determined to be the source device in this example, multiple devices may be determined to be source devices based at least in part on audio currently being output by the devices.

At block 508, the process 500 may include identifying the audio-session queue from the source device. As described above, the audio-session queue may indicate a queue of songs to be output by the source device. In some examples, the audio-session queue is static, such as in situations where output of the queued songs is from an album or playlist of fixed songs. In other examples, the audio-session queue may be dynamic and may change based at least in part on how a user interacts with the audio being output. For example, a user's indication that he or she likes the song being output may cause the audio-session queue to change such that similar songs to the liked song are added to the queue, or moved up in the queue, while dissimilar songs are removed from the queue, or moved down in the queue. In examples, an audio-session queue storage/access component, such as the audio-session queue storage/access component 134 described with respect to FIG. 1, may be utilized to identify the audio-session queue.

At block 510, the process 500 may include determining one or more target devices. Using the example provided above, the user utterance included "add the music to the kitchen." In this example, the remote system may determine, along with the intent to add music to a device, that the device to which the music is to be added is associated with the word "kitchen." The word "kitchen" may correspond to an identifier of a device associated with the environment. For example, during setup of a device, the user may be queried to provide a naming indicator for the device, which may, in this example, be a naming indicator associated with a location within the environment that the device is situated. Additionally, or alternatively, the identifier of the device may be learned over time, such as through analysis of user utterances indicating that the device is located in a given portion of the environment. It should be noted that while location-based identifiers are used herein, they are used by way of illustration only. The identifiers of devices may be any identifier, such as "Device 1," "1," or any other word, number, or combination thereof. The devices may each have their own device number or alpha-numeric identifier that may be utilized as the identifier of the device for purposes of sending and receiving data. Using the example provided with respect to FIG. 5, the target device may be determined to be the "kitchen" device.

In addition to the device identifier provided explicitly from the user utterance, one or more inferences may be made as to the target devices. For example, when the intent corresponds to an intent to add the audio-session queue to a second device while continuing to output the audio by a first device, the first device may also be determined to be a target device. By way of further example, the user utterance may include an anaphora, such as the use of the word "here" in the utterance "add the music here." At least one of the target devices may be determined to be the device that captured the audio representing the user utterance based at least in part on the anaphora of "here."

At block 512, the process 500 may include matching a state of the target device with the state of the source device. For example, each device may be associated with a state. The state of a device may be, for example, an audio-output state where the device is currently outputting audio and/or an inactive state where the device is not currently outputting audio. Additionally, when multiple devices are outputting different audio, such as when a first device is outputting a first song and a second device is outputting a second song, each of the devices may be associated with a different audio-output state. A state controller, such as the media-grouping state controller 140 described with respect to FIG. 1, may be configured to identify and/or determine the state of one or more of the devices. Based at least in part on receiving a user utterance to control audio output on the devices, the state controller may cause control data to be sent to one or more of the devices to change the state of those devices.

For example, a first device may be currently outputting audio associated with an audio-session queue. Based at least in part on the first device currently outputting audio, the state controller may identify and/or determine that the first device is associated with a first audio-output state. A second device that is associated with the first device may not be currently outputting audio. Based at least in part on the second device not outputting audio, the state controller may identify and/or determine that the second device is associated with an inactive state. The state controller may also receive data from, for example, other components of the remote system indicating that the user desires to act with respect to output of the audio. For example, it may be determined that the user utterance corresponds to an intent to output the audio on the second device in addition to the first device, or otherwise to add the second device to the audio session. The state controller may, based at least in part on information provided by the other components, cause the inactive state of the second device to change to the audio-output state of the first device. In this example, actions taken by the first device may also be taken by the second device, such as, for example, outputting the audio, accessing audio-session queues, and/or controlling audio output volumes.

The state controller may also be configured to cause a device of multiple associated devices to act as a hub device. The hub device may control the other devices not designated as a hub device. In these examples, data may flow from the non-hub devices to the hub device, which may communicate on behalf of the hub device and the non-hub devices with the remote system and/or a third-party remote system. Selection of the hub device is described in more detail with respect to FIG. 8, below.

At block 514, the process 500 may include dissociating the source device from the audio-session queue. For example, when the user utterance corresponds to an intent to output audio on a first device that is currently outputting audio and on a second device that is not currently outputting the audio, the first device and the second device may be determined to be target devices, as described above with respect to block 510. The audio-session queue may be dissociated from the source device, and then at block 516, the audio-session queue may be associated with the first device and the second device as the determined target devices. In examples, associating and/or dissociating audio-session queues may be perform by an audio-session queue storage/access component, such as the audio-session queue storage/access component 148 described with respect to FIG. 1. In examples, associating and/or dissociating audio-session queues may be performed after confirmatory data has been received from the third party associated with the audio-session queue. The confirmatory data may indicate that the intended retargeting of the audio-session queue from a first device to a first device and a second device was successful.

At block 518, the process 500 may include causing output of audio representing a response to the user utterance. For example, if the second device was successfully added such that the audio-session queue is associated with the first device and the second device, audio may be output indicating that the command provided by the user was successfully carried out. Output of audio may be performed via the one or more speakers 114 of a communal device 102, for example.

FIG. 6 illustrates a flow diagram of a process 600 for moving output of audio from a first device to a second device. The order in which the operations or steps are described is not intended to be construed as a limitation, and any number of the described operations may be combined in any order and/or in parallel to implement process 600.

At block 602, process 600 may include receiving, from a first device, audio data representing a user utterance. In examples, the first device may be a communal device, such as the communal devices 102 described above with respect to FIG. 1. One or more microphones of the first device may capture audio representing the user utterance and may generate corresponding audio data. That audio data may be sent from the first device to a remote system, for example, and may be received at the remote system. In examples, the audio data may be received via an automatic speech recognition component, such as the automatic speech recognition component 136 described with respect to FIG. 12 below. The first device may be situated in a first portion of an environment and may be associated with one or more other devices situated in other portions of the environment.

At block 604, the process 600 may include determining an intent to output audio via a second device and not via the first device. For example, automatic speech recognition techniques may be utilized to generate text data corresponding to the audio data. The text data may represent words determined from the audio data. Natural language understanding techniques may be utilized to generate intent data that may represent an intent determined from the text data. In examples, a natural language understanding component of the remote system, such as the natural language understanding component 138 described with respect to FIG. 12 below, may be utilized. In this example, the user utterance may be, for example, "move the music to the kitchen." In this example, the first device may be outputting audio corresponding to music. Based at least in part on the intent data, it may be determined that the user utterance corresponds to a "move" intent, which may represent an intent to output audio on a second device and to cease outputting audio on the first device.

At block 606, the process 600 may include determining a source device associated with the audio. For example, an audio-session queue may be associated with a device that is currently outputting audio. As described in this example, the first device may be currently outputting audio corresponding to music. An audio-session queue that indicates a queue of songs to be output by the first device may be associated with the first device based at least in part on the first device currently outputting the audio. In examples, an audio-session queue storage/access component, such as the audio-session queue storage/access component 134 described with respect to FIG. 1, may be utilized to determine the source device. It should be understood that while one device is determined to be the source device in this example, multiple devices may be determined to be source devices based at least in part on audio currently being output by the devices.

At block 608, the process 600 may include identifying the audio-session queue from the source device. As described above, the audio-session queue may indicate a queue of songs to be output by the source device. In some examples, the audio-session queue is static, such as in situations where output of the queued songs is from an album of fixed songs. In other examples, the audio-session queue may be dynamic and may change based at least in part on how a user interacts with the audio being output. For example, a user's indication that he or she likes the song being output may cause the audio-session queue to change such that similar songs to the liked song are added to the queue, or moved up in the queue, while dissimilar songs are removed from the queue, or moved down in the queue. In examples, an audio-session queue storage/access component, such as the audio-session queue storage/access component 134 described with respect to FIG. 1, may be utilized to identify the audio-session queue.

At block 610, the process 600 may include determining one or more target devices. Using the example provided above, the user utterance included "move the music to the kitchen." In this example, the remote system may determine, along with the intent to move music to a device, that the device to which the music is to be moved is associated with the word "kitchen." The word "kitchen" may correspond to an identifier of a device associated with the environment. For example, during setup of a device, the user may be queried to provide a naming indicator for the device, which may, in this example, be a naming indicator associated with a location within the environment that the device is situated. Additionally, or alternatively, the identifier of the device may be learned over time, such as through analysis of user utterances indicating that the device is located in a given portion of the environment. It should be noted that while location-based identifiers are used herein, they are used by way of illustration only. The identifiers of devices may be any identifier, such as "Device 1," "1," or any other word, number, or combination thereof. The devices may each have their own device number or alpha-numeric identifier that may be utilized as the identifier of the device for purposes of sending and receiving data. Using the example provided with respect to FIG. 5, the target device may be determined to be the "kitchen" device.

In addition to the device identifier provided explicitly from the user utterance, one or more inferences may be made as to the target devices. For example, when the user utterance corresponds to an intent to move the audio-session queue to a second device, if the second device is the only other device associated with the first device, it may be inferred that the target device is the second device At block 612, the process 600 may include associating a state of the target device with a state of the source device. For example, each device may be associated with a state. The state of a device may be, for example, an audio-output state where the device is currently outputting audio and/or an inactive state where the device is not currently outputting audio. Additionally, when multiple devices are outputting different audio, such as when a first device is outputting a first song and a second device is outputting a second song, each of the devices may be associated with a different audio-output state. A state controller, such as the media-grouping state controller 140 described with respect to FIG. 1, may be configured to identify and/or determine the state of one or more of the devices. Based at least in part on receiving a user utterance to control audio output on the devices, the state controller may cause control data to be sent to one or more of the devices to change the state of those devices.

For example, a first device may be currently outputting audio associated with an audio-session queue. Based at least in part on the first device currently outputting audio, the state controller may identify and/or determine that the first device is associated with a first audio-output state. A second device that is associated with the first device may not be currently outputting audio. Based at least in part on the second device not outputting audio, the state controller may identify and/or determine that the second device is associated with an inactive state. The state controller may also receive data from, for example, other components of the remote system indicating that the user desires to act with respect to output of the audio. For example, it may be determined that the user utterance corresponds to an intent to output the audio on the second device and cease outputting audio on the first device. The state controller may, based at least in part on information provided by the other components, cause the inactive state of the second device to change to the audio-output state of the first device. The state controller may also cause the audio-output state of the first device to change to an inactive state. In this example, the second device may output the audio while the first device may cease outputting the audio.

The state controller may also be configured to cause a device of multiple associated devices to act as a hub device. The hub device may control the other devices not designated as a hub device. In these examples, data may flow from the non-hub devices to the hub device, which may communicate on behalf of the hub device and the non-hub devices with the remote system and/or a third-party remote system. Selection of the hub device is described in more detail with respect to FIG. 8, below.

At block 614, the process 600 may include moving the audio-session queue from being associated with the source device to being associated with the target device. For example, when the user utterance corresponds to an intent to output audio on a second device that is not currently outputting the audio and to cease outputting audio on the first device that is currently outputting the audio, the second device may be determined to be target device, as described above with respect to block 610. The audio-session queue may be dissociated from the source device and the audio-session queue may be associated with the second device as the determined target device. In examples, associating and/or dissociating audio-session queues may be perform by an audio-session queue storage/access component, such as the audio-session queue storage/access component 148 described with respect to FIG. 1. In examples, associating and/or dissociating audio-session queues may be performed after confirmatory data has been received from the third party associated with the audio-session queue. The confirmatory data may indicate that the intended retargeting of the audio-session queue from a first device to a second device was successful.

At block 616, the process 600 may include causing output of audio representing a response to the user utterance. For example, if the audio-session queue was successfully associated with the second device and successfully dissociated from the first device, audio may be output indicating that the command provided by the user was successfully carried out. Output of audio may be performed via the one or more speakers 114 of a communal device 102, for example.

FIG. 7 illustrates a flow diagram of a process 700 for causing one or multiple devices to cease output of audio. The order in which the operations or steps are described is not intended to be construed as a limitation, and any number of the described operations may be combined in any order and/or in parallel to implement process 700.

At block 702, process 700 may include receiving audio data representing a user utterance. In examples, the audio data may be received from a first device, which may be a communal device, such as the communal devices 102 described above with respect to FIG. 1. One or more microphones of the first device may capture audio representing the user utterance and may generate corresponding audio data. That audio data may be sent from the first device to a remote system, for example, and may be received at the remote system. In examples, the audio data may be received via an automatic speech recognition component, such as the automatic speech recognition component 136 described with respect to FIG. 12 below. The first device may be situated in a first portion of an environment and may be associated with one or more other devices situated in other portions of the environment.

At block 704, the process 700 may include determining an intent to cease output of audio on a device currently outputting audio. For example, the device currently outputting audio may be the first device from which the audio data was received. In other examples, the device currently outputting audio may be another device associated with the first device. To determine an intent, for example, automatic speech recognition techniques may be utilized to generate text data corresponding to the audio data. The text data may represent words determined from the audio data. Natural language understanding techniques may be utilized to generate intent data that may represent an intent determined from the text data. In examples, a natural language understanding component of the remote system, such as the natural language understanding component 138 described with respect to FIG. 12 below, may be utilized. In this example, the user utterance may be, for example, "stop the music in the kitchen." In this example, the first device and a second device may be outputting audio corresponding to music. Based at least in part on the intent data, it may be determined that the user utterance corresponds to a "remove" intent, which may represent an intent to cease output of audio on the second device and to continue outputting audio on the first device.

At block 706, the process 700 may include identifying an audio-session queue associated with the device. An audio-session queue that indicates a queue of songs to be output by the device may be associated with the device based at least in part on the device currently outputting the audio. It should be understood that while one device is determined to be the source device in this example, multiple devices may be determined to be source devices based at least in part on audio currently being output by the devices. In some examples, the audio-session queue is static, such as in situations where output of the queued songs is from an album of fixed songs. In other examples, the audio-session queue may be dynamic and may change based at least in part on how a user interacts with the audio being output. For example, a user's indication that he or she likes the song being output may cause the audio-session queue to change such that similar songs to the liked song are added to the queue, or moved up in the queue, while dissimilar songs are removed from the queue, or moved down in the queue. In examples, an audio-session queue storage/access component, such as the audio-session queue storage/access component 134 described with respect to FIG. 1, may be utilized to identify the audio-session queue.

At block 708, the process 700 may include determining whether other devices are outputting the audio associated with the audio-session queue. If not, the process 700 may continue to block 716 where the audio-session queue may be dissociated from the device. In examples, associating and/or dissociating audio-session queues may be perform by an audio-session queue storage/access component, such as the audio-session queue storage/access component 148 described with respect to FIG. 1. At block 718, the process 700 may include causing output of audio representing a response to the user utterance. For example, when output of the audio ceases on the device, the audio may provide confirmation that the user's utterance has been successfully acted upon. Output of audio may be performed via the one or more speakers 114 of a communal device 102, for example.

Returning to block 708, if other devices are outputting the audio, then the process 700 may continue to block 710, where the state of the device may be dissociated from the state of the other devices that are outputting the audio. For example, each device may be associated with a state. The state of a device may be, for example, an audio-output state where the device is currently outputting audio and/or an inactive state where the device is not currently outputting audio. Additionally, when multiple devices are outputting different audio, such as when a first device is outputting a first song and a second device is outputting a second song, each of the devices may be associated with a different audio-output state. A state controller may be configured to identify and/or determine the state of one or more of the devices. Based at least in part on receiving a user utterance to control audio output on the devices, the state controller may cause control data to be sent to one or more of the devices to change the state of those devices.

For example, a first device and a second device may be currently outputting audio associated with an audio-session queue. Based at least in part on the first device and the second device currently outputting the audio, the state controller may identify and/or determine that the first device and the second device are associated with an audio-output state. The state controller may also receive data from, for example, other components of the remote system indicating that the user desires to act with respect to output of the audio. For example, it may be determined that the user utterance corresponds to an intent to cease outputting the audio on the first device and continue outputting the audio on the second device. The state controller may, based at least in part on information provided by the other components, cause the audio-output state of the first device to change to the inactive state. In this example, the second device may output the audio while the first device may cease outputting the audio.

The state controller may also be configured to cause a device of multiple associated devices to act as a hub device. The hub device may control the other devices not designated as a hub device. In these examples, data may flow from the non-hub devices to the hub device, which may communicate on behalf of the hub device and the non-hub devices with the remote system and/or a third-party remote system. Selection of the hub device is described in more detail with respect to FIG. 8, below.

At block 712, the process 700 may include dissociating the audio-session queue from the device. In examples, associating and/or dissociating audio-session queues may be performed after confirmatory data has been received from the third party associated with the audio-session queue. The confirmatory data may indicate that the intended retargeting of the audio-session queue from a first device and a second device to just a second device was successful.

Returning to block 708, if other devices are not outputting the audio associated with the audio-session queue, the process 700 may continue to block 714 where the audio-session queue may be dissociated from the device currently outputting the audio. At block 716, the process 700 may include causing output of a response to the user utterance confirming that the command has been processed.

Figure 8:
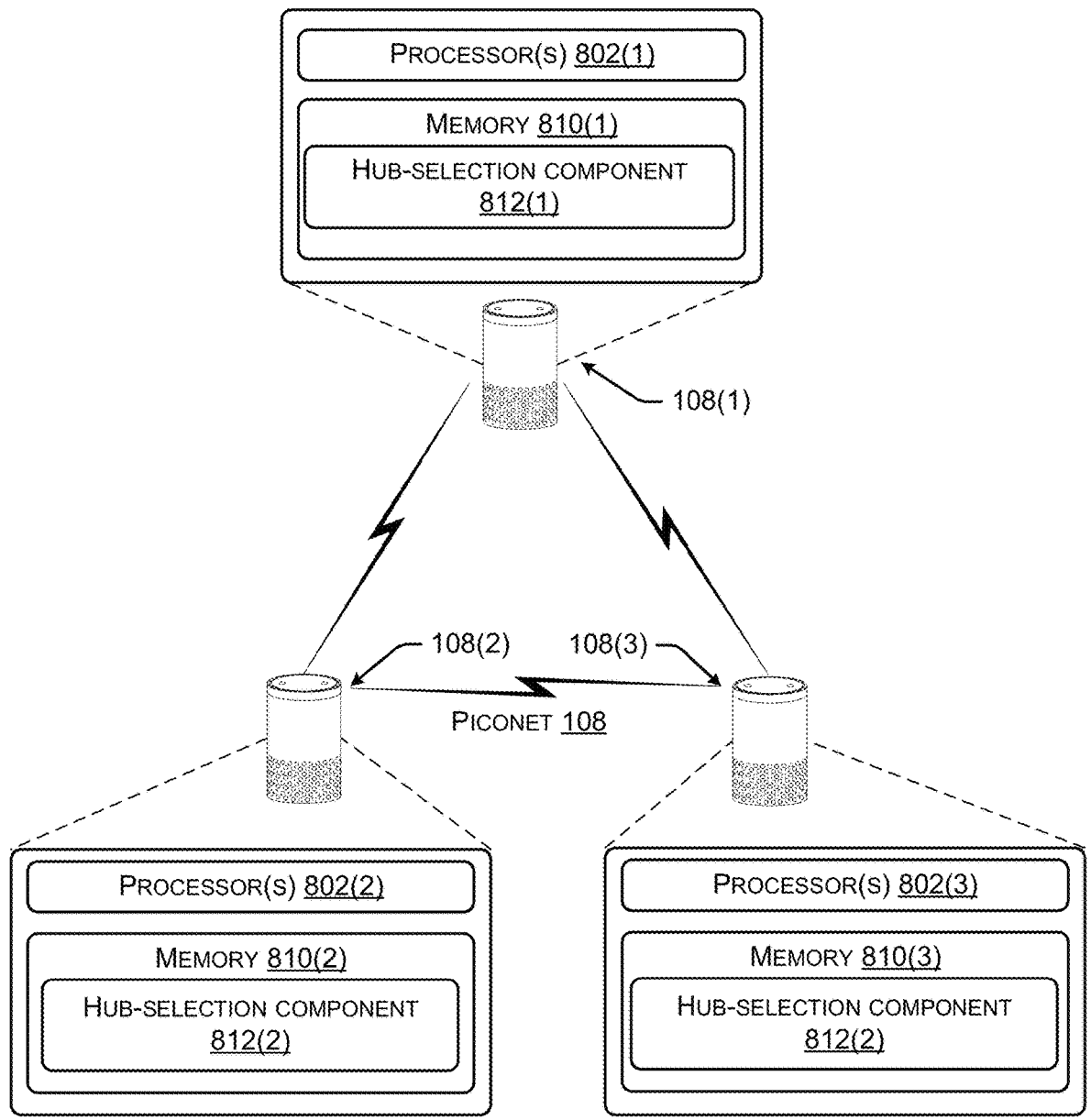
FIG. 8 illustrates a schematic diagram of an example environment for selecting one of multiple devices as a hub device.

FIG. 8 illustrates a schematic diagram of an example environment for selecting one of multiple devices as a hub device. As illustrated, devices, also described as communal devices, include one or more processors 802(1), 802(2), and 802(3). As noted above, in some instances each communal device 108(1)-(3) may include a single radio unit to communicate over multiple protocols (e.g., Bluetooth and BLE), two or more radio units to communicate over two or more protocols, or the like. As used herein, a "radio" and "radio component" may be used interchangeably. Again, in some instances, the devices include any other number of radios, including instances where the devices comprise a single radio configured to communicate over two or more different protocols.

In addition to the above, the devices 108(1)-(3) may include respective memory (or "computer-readable media") 810(1), 810(2), and 810(3), which may store respective instances of a hub-selection component 812(1), 812(2), and 812(3). The hub-selection components 812(1)-(3) may generate messages (e.g., audio-session queue messages, communication-strength messages, etc.) and one or more maps (e.g., audio-session queue maps, communication-strength maps, etc.), and may be used to select/determine the communication hub. Further, the hub-selection components 812(1)-(3) may send and/or receive the hub-selection messages and store an indication of the selected hub and the amount of time for which the selected device is to be act as the hub. The hub-selection components 812(1)-(3) may also set a timer for determining the amount of time for which the selected device is to act as a hub, or may otherwise determine when the time for the device to act as the hub has elapsed.

In some instances, messages sent by each device indicate a current state of the device and whether the device is associated with an audio-session queue (also referred to as a "state value"), a current connection strength to the WLAN of the device, information identifying the WLAN, information identifying the device, and/or the like. With this information, each hub-selection component 812(1)-(3) may determine the device that is to be selected as the communication hub. In some instances, the hub-selection components 812(1)-(3) may implement an algorithm that selects the device that is associated with an audio-session queue and/or the device that was first associated with a given audio-session queue as the communication hub. In other instances, the components 812(1)-(3) may select the device having the highest connection strength as the communication hub. In still other instances, each component is configured to implement a cost function that selects the communication hub based on one or more weighted factors, such as current association with audio-session queues, connection strengths, and so forth. In other examples, one of the devices may be designated by the user as the hub and/or one of the device may include additional components and/or functionality and may be designed as the hub based at least in part on those additional components and/or functionality.

The communal devices 108(1)-(3) and a primary device may couple with one another over a short-range wireless network and thus collectively forming a piconet 108. In the illustrated example, each of the devices comprise devices configured to communicate both with one another over a short-range connection as well as over a network 118. In some instances, meanwhile, while some of the communal devices 108(1)-(3) may be configured to communicate over a short-range wireless network and over the network 118, the other communal devices 108(1)-(3) may be configured to communicate over multiple short-range wireless protocols (e.g., Bluetooth, BLE, etc.) while being incapable of communicating over the network 118. In these instances, the communal devices 108(1)-(3) may select a communication hub that communicates with the other communal devices over a low-power protocol while communicating with the hub device over a higher-power protocol. The hub device may then communicate these messages over the network 118.

Additionally, one or more hub-selection message may be sent between communal devices in response to determining that a device it is to act as the communication hub. For instance, one or more of the non-hub devices may send a message and/or a remote system may send a message. As illustrated, the hub-selection message may indicate the device identification (DID) of the selected communication hub, in this example, the DID of the first communal device 108(1), as well as the amount of time for which the selected accessory device is to act as the communication hub. In examples, this amount of time may be preconfigured and constant, while in other instances it may vary depending on associations between the devices and an audio-session queue, the number of devices in the piconet, or the like. In response to receiving the hub-selection message, the non-hub devices may store an indication of the DID of the communication hub as well as the amount of time for which the selected accessory device is to act as the communication hub. The devices may then again send out messages after expiration of the amount of time or just prior to expiration of this amount of time to determine if the hub communication device should change.

Figure 9:
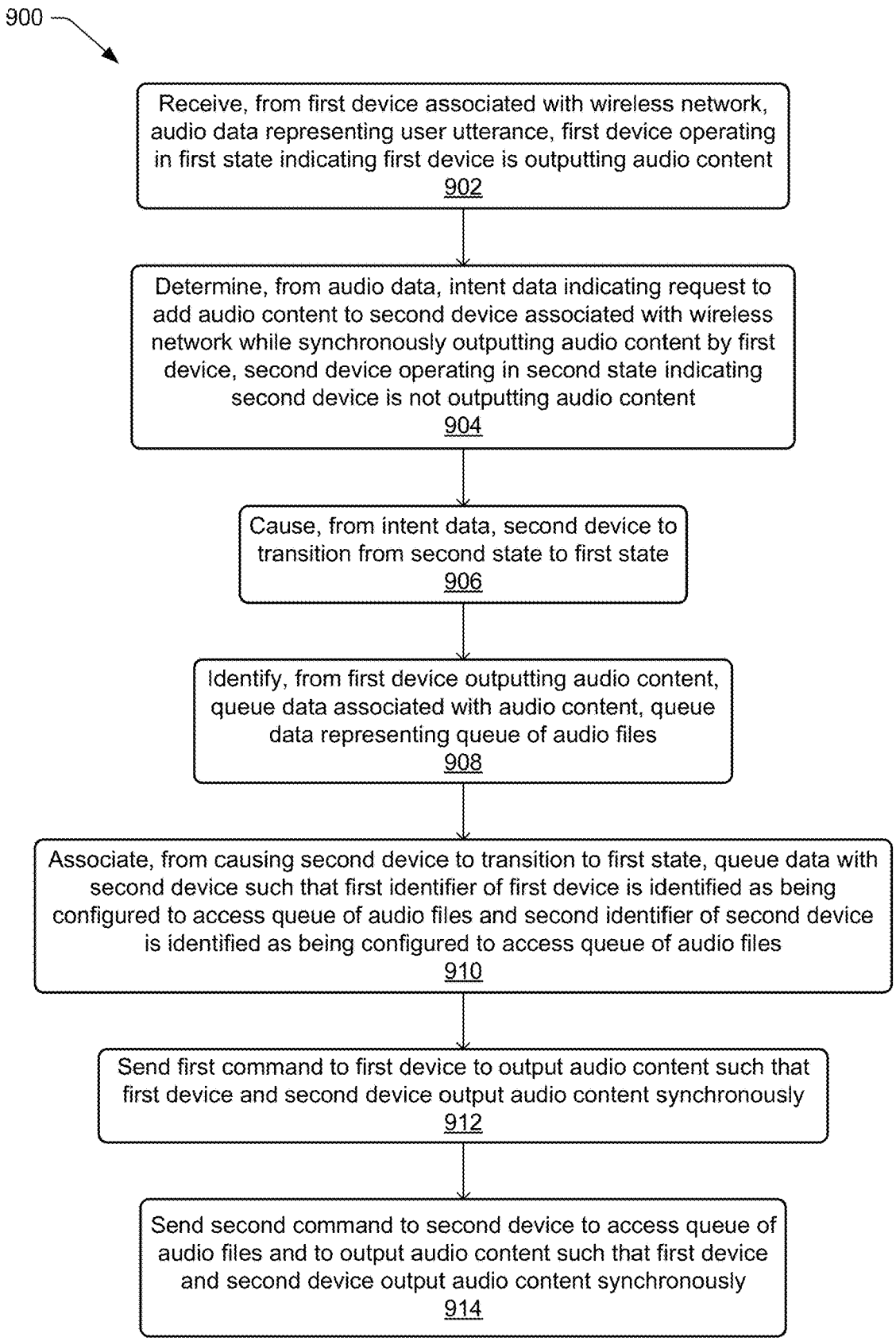
FIG. 9 illustrates a flow diagram of an example process for audio output control.
Figure 10:
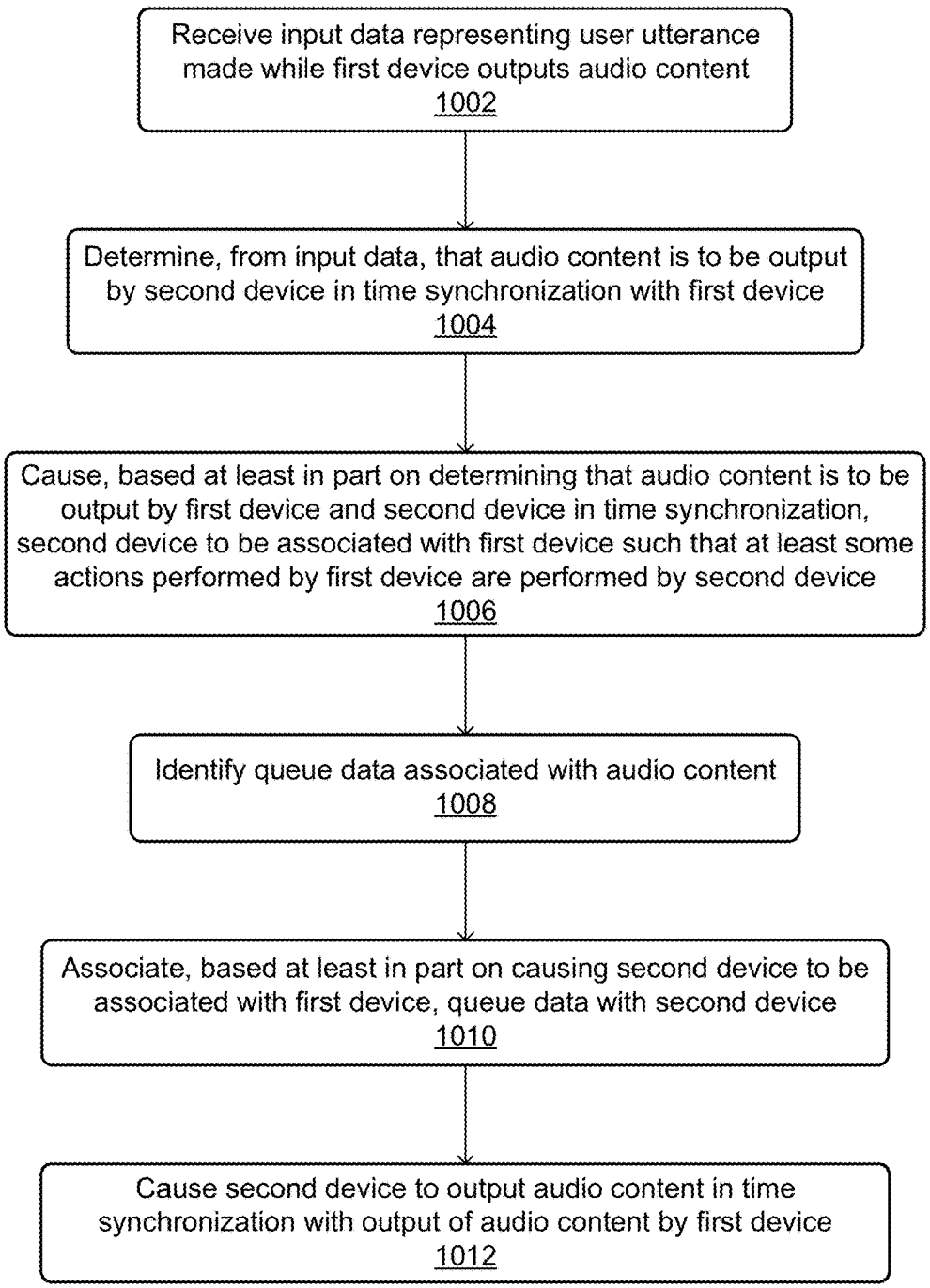
FIG. 10 illustrates a flow diagram of another example process for audio output control.
Figure 11:
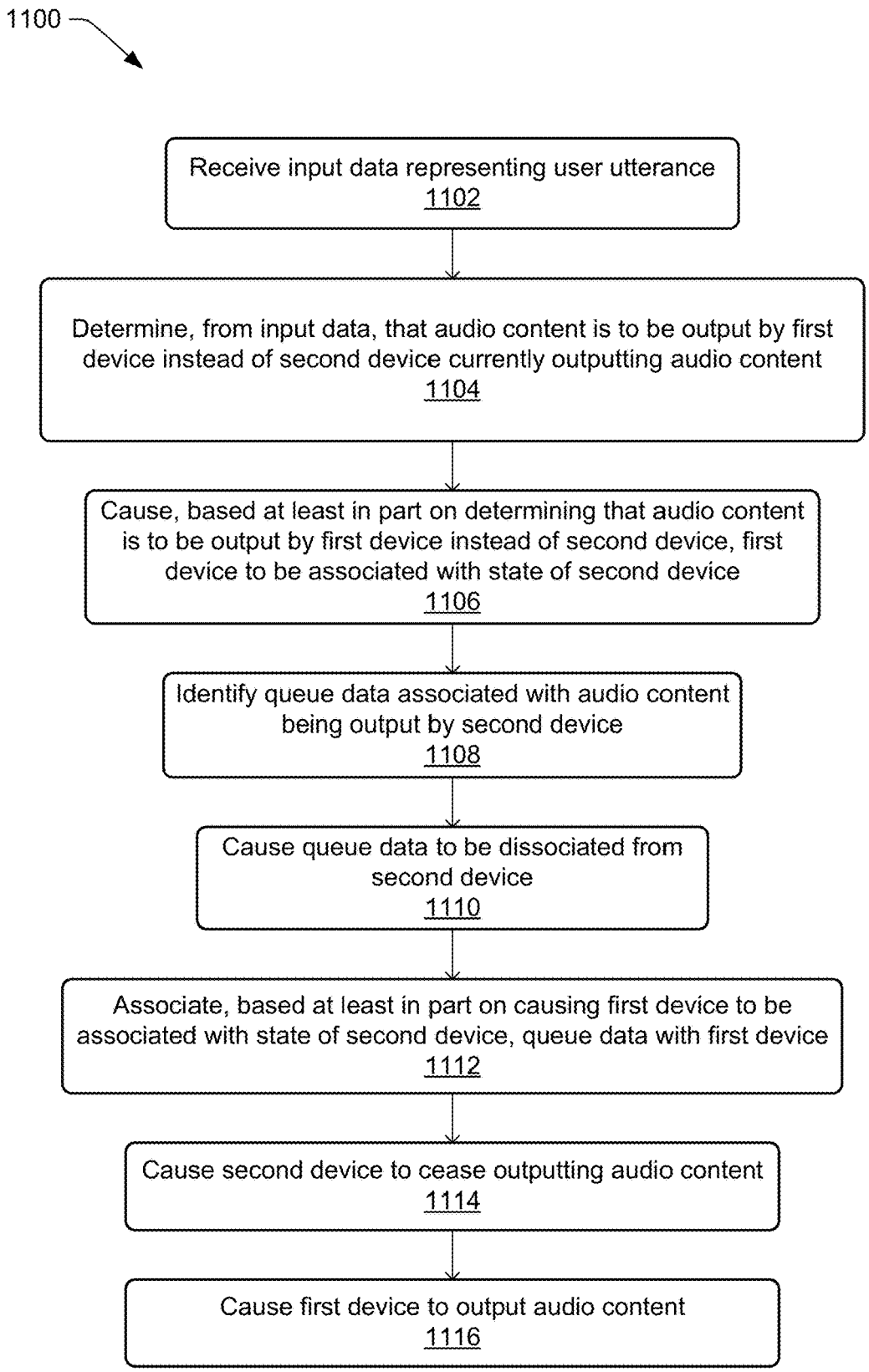
FIG. 11 illustrates a flow diagram of another example process for audio output control.

FIGS. 9-11 illustrate various processes for audio content output control. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, 8, 12, and 13, although the processes may be implemented in a wide variety of other environments, architectures and systems.

FIG. 9 illustrates a flow diagram of an example process 900 for content playback control. The order in which the operations or steps are described is not intended to be construed as a limitation, and any number of the described operations may be combined in any order and/or in parallel to implement process 900.

At block 902, process 900 may include receiving, from a first device associated with a wireless network, audio data representing a user utterance. The first device may be operating in first state indicating that the first device is outputting audio content. In examples, the first device may be a communal device, such as the communal devices 102 described above with respect to FIG. 1. One or more microphones of the first device may capture audio representing the user utterance and may generate corresponding audio data. That audio data may be sent from the first device to a remote system, for example, and may be received at the remote system. The first device may be situated in a first portion of an environment and may be associated with one or more other devices situated in other portions of the environment.

At block 904, the process 900 may include determining, from the audio data, intent data indicating a request to add the audio content to a second device associated with the wireless network while synchronously outputting the audio content by the first device. The second device may be operating in a second state indicating the second device is not outputting audio content. For example, automatic speech recognition techniques may be utilized to generate text data corresponding to the audio data. The text data may represent words determined from the audio data. Natural language understanding techniques may be utilized to generate the intent data that may represent an intent determined from the text data. In this example, the user utterance may be, for example, "add the music to the kitchen." In this example, the first device may be outputting audio corresponding to music. Based at least in part on the intent data, it may be determined that the user utterance corresponds to an "add" intent, which may represent an intent to output audio on the second device, which in this example would be associated with the naming indicator "kitchen," in addition to continuing to output audio on the first device.

At block 906, the process 900 may include causing, from the intent data, the second device to transition from the second state to the first state. For example, each device may be associated with a state, as described above. The state of a device may be, for example, an audio-output state where the device is currently outputting audio and/or an inactive state where the device is not currently outputting audio. Additionally, when multiple devices are outputting different audio, such as when a first device is outputting a first song and a second device is outputting a second song, each of the devices may be associated with a different audio-output state. A state controller may be configured to identify and/or determine the state of one or more of the devices. Based at least in part on receiving a user utterance to control audio output on the devices, the state controller may cause control data to be sent to one or more of the devices to change the state of those devices.

For example, the first device may be currently outputting audio associated with an audio-session queue. Based at least in part on the first device currently outputting audio, the state controller may identify and/or determine that the first device is associated with a first audio-output state. The second device that is associated with the first device may not be currently outputting audio. Based at least in part on the second device not outputting audio, the state controller may identify and/or determine that the second device is associated with an inactive state. The state controller may also receive data from, for example, other components of the remote system indicating that the user desires to act with respect to output of the audio. For example, it may be determined that the user utterance corresponds to an intent to output the audio on the second device in addition to the first device, or otherwise to add the second device to the audio session. The state controller may, based at least in part on information provided by the other components, cause the inactive state of the second device to change to the audio-output state of the first device. In this example, actions taken by the first device may also be taken by the second device, such as, for example, outputting the audio, accessing audio-session queues, and/or controlling audio output volumes.

The state controller may also be configured to cause a device of multiple associated devices to act as a hub device. The hub device may control the other devices not designated as a hub device. In these examples, data may flow from the non-hub devices to the hub device, which may communicate on behalf of the hub devices and the non-hub devices with the remote system and/or a third-party remote system. Selection of the hub device is described in more detail with respect to FIG. 8, above. In this example, the first device may be selected as the hub device based at least in part on the first device being the source device before the audio data was received.

At block 908, the process 900 may include identifying, from the first device outputting the audio content, queue data associated with the audio content. The queue data may represent a queue of audio files. For example, the queue data may represent an audio-session queue. An audio-session queue that indicates a queue of songs to be output by the first device may be associated with the first device based at least in part on the first device currently outputting the audio. It should be understood that while one device is determined to be the source device in this example, multiple device may be determined to be source devices based at least in part on audio currently being output by the devices.

In some examples, the audio-session queue is static, such as in situations where output of the queued songs is from an album of fixed songs. In other examples, the audio-session queue may be dynamic and may change based at least in part on how a user interacts with the audio being output. For example, a user's indication that he or she likes the song being output may cause the audio-session queue to change such that similar songs to the liked song are added to the queue, or moved up in the queue, while dissimilar songs are removed from the queue, or moved down in the queue.

At block 910, the process 900 may include associating, from causing the second device to transition to the first state, the queue data with the second device such that a first identifier of the first device is identified as being configured to access the queue of audio file and a second identifier of the second device is identified as being configured to access the queue of audio files. The audio-session queue may also be dissociated from the first device, which may be described as the source device. The audio-session queue may then be associated with the first device and the second device as the determined target devices. In examples, associating and/or dissociating audio-session queues may be performed after confirmatory data has been received from the third party associated with the audio-session queue. The confirmatory data may indicate that the intended retargeting of the audio-session queue from a first device to a first device and a second device was successful.

At block 912, the process 900 may include sending a first command to the first device to output the audio content such that the first device and the second device output the audio content synchronously. For example, if the audio data was received during output of audio, such as in the middle of outputting a song, the first device may continue to output audio corresponding to the song without interruption.

At block 914, the process 900 may include sending a second command to the second device to access the queue of audio files and to output the audio content such that the first device and the second device output the audio content synchronously. The second device may output the audio corresponding to a portion of the song that has not been output by the first device. In this way, the first device and the second device may output the same audio, or instances of the same audio, at the same time or at substantially similar times. The second command may be generated and sent from the remote system and/or the second command may be generated and/or sent from the first device and/or another device such as a smart-home hub device.

The process 900 may additionally, or alternatively, include receiving, from a third device associated with the wireless network, second audio data representing a second user utterance. The process 900 may also include determining, from the second audio data, second intent data indicating a request to identify the audio content being output by the first device. The queue data may be determined to be associated with the first device and a portion of the audio content being output by the first device may be identified. The process 900 may also include causing output, via the third device, of audio corresponding to a response to the request. The response may be based at least in part on the portion of the audio content being output. In this way, devices that are outputting the audio content, such as the first device and/or the second device, may be queried to provide information about the audio content being output. Additionally, devices that are not outputting the audio content but that are associated with at least one of the device that are outputting the audio content may also be queried to provide the information.

The process 900 may additionally, or alternatively, include receiving, from the second device, second audio data representing a second user utterance. The process 900 may also include determining, from the second audio data, second intent data indicating a request to cease output of the audio content. Based at least in part on receiving the second audio data from the second device and the second intent data, the process 900 may include causing the audio content to cease being output by the second device. Additionally, the audio content may be caused to be ceased from being output by the first device based at least in part on the first device and the second device operating in the first state.

The process 900 may additionally, or alternatively, include determining, via automatic speech recognition, text data corresponding to the user utterance. The process 900 may also include determining that the text data includes a word that corresponds to an anaphora. The process 900 may also include determining that the anaphora corresponds to the audio content based on the audio content being output by the first device at the time the audio data was received. In this example, the anaphora may be the word "this," and based at least in part on the first device outputting the audio content, it may be determined that "this" corresponds to the audio content. Determining the intent data representing the intent to output the audio content on the second device may be based at least in part on determining that the anaphora refers to the audio content.

FIG. 10 illustrates a flow diagram of another example process 1000 for content playback control. The order in which the operations or steps are described is not intended to be construed as a limitation, and any number of the described operations may be combined in any order and/or in parallel to implement process 1000.

At block 1002, process 1000 may include receiving input data representing a user utterance made while a first device outputs audio content. The input data may be received via a first device. In examples, the input data may be audio data. In other examples, the input data may be a command from, for example, an application running on a device being used by the user, such as a mobile phone. The first device may output audio content in a first state. In examples, the first device may be a communal device, such as the communal devices 102 described above with respect to FIG. 1. One or more microphones of the first device may capture audio representing the user utterance and may generate corresponding audio data. That audio data may be sent from the first device to a remote system, for example, and may be received at the remote system. The first device may be situated in a first portion of an environment and may be associated with one or more other devices situated in other portions of the environment.

At block 1004, the process 1000 may include determining, from the input data, that the audio content is to be output by a second device in time synchronization with the first device. For example, automatic speech recognition techniques may be utilized to generate text data corresponding to the input data. The text data may represent words determined from the input data. Natural language understanding techniques may be utilized to generate the intent data that may represent an intent determined from the text data. In this example, the user utterance may be, for example, "add the music to the kitchen." In this example, the first device may be outputting audio corresponding to music. Based at least in part on the intent data, it may be determined that the user utterance corresponds to an "add" intent, which may represent an intent to output audio on the second device, which in this example would be associated with the naming indicator "kitchen," in addition to continuing to output audio on the first device.

At block 1006, the process 1000 may include causing, based at least in part on determining that the audio content is to be output by the first device and the second device in time synchronization, the second device to be associated with the first device such that at least some actions performed by the first device are performed by the second device. For example, each device may be associated with a state, as described above. The state of a device may be, for example, an audio-output state where the device is currently outputting audio and/or an inactive state where the device is not currently outputting audio. Additionally, when multiple devices are outputting different audio, such as when a first device is outputting a first song and a second device is outputting a second song, each of the devices may be associated with a different audio-output state. A state controller may be configured to identify and/or determine the state of one or more of the devices. Based at least in part on receiving a user utterance to control audio output on the devices, the state controller may cause control data to be sent to one or more of the devices to change the state of those devices.

For example, the first device may be currently outputting audio associated with an audio-session queue. Based at least in part on the first device currently outputting audio, the state controller may identify and/or determine that the first device is associated with a first audio-output state. The second device that is associated with the first device may not be currently outputting audio. Based at least in part on the second device not outputting audio, the state controller may identify and/or determine that the second device is associated with an inactive state. The state controller may also receive data from, for example, other components of the remote system indicating that the user desires to act with respect to output of the audio. For example, it may be determined that the user utterance corresponds to an intent to output the audio on the second device in addition to the first device, or otherwise to add the second device to the audio session. The state controller may, based at least in part on information provided by the other components, cause the inactive state of the second device to change to the audio-output state of the first device. In this example, actions taken by the first device may also be taken by the second device, such as, for example, outputting the audio, accessing audio-session queues, and/or controlling audio output volumes.

The state controller may also be configured to cause a device of multiple associated devices to act as a hub device. The hub device may control the other devices not designated as a hub device. In these examples, data may flow from the non-hub devices to the hub device, which may communicate on behalf of the hub devices and the non-hub devices with the remote system and/or a third-party remote system. Selection of the hub device is described in more detail with respect to FIG. 8, above. In this example, the first device may be selected as the hub device based at least in part on the first device being the source device before the audio data was received.

At block 1008, the process 1000 may include identifying queue data associated with the audio content. The queue data may be associated with the first device based at least in part on the first device outputting the audio content. For example, the queue data may represent an audio-session queue. An audio-session queue that indicates a queue of songs to be output by the first device may be associated with the first device based at least in part on the first device currently outputting the audio. It should be understood that while one device is determined to be the source device in this example, multiple device may be determined to be source devices based at least in part on audio currently being output by the devices.

In some examples, the audio-session queue is static, such as in situations where output of the queued songs is from an album of fixed songs. In other examples, the audio-session queue may be dynamic and may change based at least in part on how a user interacts with the audio being output. For example, a user's indication that he or she likes the song being output may cause the audio-session queue to change such that similar songs to the liked song are added to the queue, or moved up in the queue, while dissimilar songs are removed from the queue, or moved down in the queue.

At block 1010, the process 1000 may include associating, based at least in part on causing the second device to be associated with the first device, the queue data with the second device. The audio-session queue may also be dissociated from the first device, which may be described as the source device. The audio-session queue may then be associated with the first device and the second device as the determined target devices. In examples, associating and/or dissociating audio-session queues may be performed after confirmatory data has been received from the third party associated with the audio-session queue. The confirmatory data may indicate that the intended retargeting of the audio-session queue from a first device to a first device and a second device was successful.

At block 1012, the process 1000 may include causing the second device to output the audio content in time synchronization with output of the audio content by the first device. For example, if the audio data was received during output of audio, such as in the middle of outputting a song, the first device may continue to output audio corresponding to the song without interruption. Additionally, the second device may output the audio corresponding to a portion of the song that has not been output by the first device. In this way, the first device and the second device may output the same audio, or instances of the same audio, at the same time or at substantially similar times. As used herein, "in time synchronization" means that the first device and the second device output the audio, or instances of the audio, at the same time or at substantially similar times. For example, there may be a 0.1 to 25 millisecond difference and/or delay between output of the audio by the first device as compared to output of the audio by the second device.

The process 1000 may additionally, or alternatively, include receiving, from a third device located in a third environment, second input data representing a second user utterance. The process 1000 may also include determining, from the second input data, intent data indicating a request to identify the audio content being output by the first device. The queue data may be determined to be associated with the first device and a portion of the audio content being output by the first device may be identified. The process 1000 may also include causing output, via the third device, of audio corresponding to a response to the request. The response may be based at least in part on the portion of the audio content being output. In this way, devices that are outputting the audio content, such as the first device and/or the second device, may be queried to provide information about the audio content being output. Additionally, devices that are not outputting the audio content but that are associated with at least one of the device that are outputting the audio content may also be queried to provide the information.

The process 1000 may additionally, or alternatively, include receiving, from the second device, second input data representing a second user utterance. The process 1000 may also include determining, from the second input data, intent data indicating a request to alter output of the audio content. Based at least in part on receiving the second input data from the second device and the intent data, the process 1000 may include causing output of the audio content to be altered. For example, the process 1000 may include generating, based at least in part on the intent data, directive data indicating that the audio content output by the second device is to be altered. Additionally, the audio content may be altered via the first device based at least in part on the first device and the second device operating in the first state.

The process 1000 may additionally, or alternatively, include determining that the user utterance includes an anaphora and determining that the anaphora corresponds to the audio content based on the audio content being output by the first device at the time the input data was received. In this example, the anaphora may be the word "this," and based at least in part on the first device outputting the audio content, it may be determined that "this" corresponds to the audio content. Determining that the audio content is to be output by the first device and the second device may be based at least in part on determining that the anaphora refers to the audio content.

The process 1000 may additionally, or alternatively, include determining that the user utterance includes an anaphora and determining that the anaphora corresponds to an identification of the first device based at least in part on the input data being received via the first device. In this example, the anaphora may be the word "here," and based at least in part on receiving the input data from the first device, it may be determined that "here" corresponds to the first device. Determining that the audio content is to be output by the first device and the second device may be based at least in part on determining that the anaphora refers to the first device.

The process 1000 may additionally, or alternatively, include determining that an amount of time has passed since the queue data was associated with the second device and determining that the amount of time is more than a threshold amount of time. The process 1000 may also include causing the second device to be dissociated from the first device based at least in part on determining that the amount of time is more than the threshold amount of time. Dissociating devices may also be based at least in part on a determination that the association of the devices occurs on a previous day. The states of the devices may also be dissociated and the audio-session queue may be dissociated from one or all of the previously-associated devices.

The process 1000 may also include receiving, via the first device, second input data representing a second user utterance and determining intent data indicating a request to output second audio content. The process 1000 may also include determining, based at least in part on the intent data, that the second audio content is to be output via the first device without altering output of the first audio content via the second device. The process 1000 may also include causing the second device to be dissociated from the first device based at least in part on determining that the second audio content is to be output via the first device without altering output of the first audio content via the second device.

The process 1000 may also include receiving, via the first device, second input data representing a second user utterance and determining, based at least in part on the second input data, intent data indicating a request to output second audio content. The process 1000 may also include determining that the second device is outputting the first audio content and causing the first device to output audio representing a request to authorize the second audio content to be output via the second device. Third input data representing a response to the request by be received via the first device and the process 1000 may include causing the second device to output the second audio content based at least in part on the third input data indicating authorization.

The process 1000 may additionally, or alternatively, include receiving, via the second device, second input data representing a second user utterance, wherein receiving the second input data may correspond to an event associated with the second device. The process 1000 may also include determining, based at least in part on the second input data, intent data indicating a request to alter output of the audio content and generating, based at least in part on the second intent data directive data. The directive data may indicate that the audio content output by the second device is to be altered. The process 1000 may also include sending to the second device, the directive data and causing the audio content to be altered on the first device and the second device based at least in part on sending the directive data to the second device. In this way, an event that alters output of audio content on one device of multiple devices operating in the same or a similar state and/or that are associated with an audio-session queue may result in data corresponding to one event to be sent to the remote system for processing and may result in directive data being sent to just one of the devices. From there, the other associated devices may be caused to alter the audio content output based at least in part on the associated state and/or associated audio-session queue.

The process 1000 may additionally, or alternatively, include sending, to a remote system, state data indicating that the first device and the second device are operating in a first state and sending, to the remote system, queue-association data indicating that the queue data is associated with the first device and the second device. The process 1000 may also include receiving, from the remote system, request data indicating a request to alter output of the audio content and sending, to at least one of the first device or the second device, directive data representing a directive to alter output of the audio content on the first device and the second device based at least in part on the state data and the queue-association data. In this way, data indicating which devices are operating in the same or a similar state and which devices are associated with an audio-session queue may be communicated with third parties that, for example, provide one or more of the devices on which audio content is output, provide one or more applications for controlling audio content output, and/or provide means for accessing and/or generating audio-session queues.

FIG. 11 illustrates a flow diagram of an example process 1100 for content playback control. The order in which the operations or steps are described is not intended to be construed as a limitation, and any number of the described operations may be combined in any order and/or in parallel to implement process 1100.

At block 1102, process 1100 may include receiving input data representing a user utterance. The input data may be received from a first device. In examples, the input data may be audio data. In other examples, the input data may be a command from, for example, an application running on a device being used by the user, such as a mobile phone. The first device may output audio content and may be operating in a first state. In examples, the first device may be a communal device, such as the communal devices 102 described above with respect to FIG. 1. One or more microphones of the first device may capture audio representing the user utterance and may generate corresponding input data. That input data may be sent from the first device to a remote system, for example, and may be received at the remote system. The first device may be situated in a first portion of an environment and may be associated with one or more other devices situated in other portions of the environment.

At block 1104, the process 1100 may include determining, from the input data, that audio content is to be output by a first device instead of a second device currently outputting the audio content. The first device may be associated with a first state. The second device may be associated with a second state. For example, automatic speech recognition techniques may be utilized to generate text data corresponding to the input data. The text data may represent words determined from the input data. Natural language understanding techniques may be utilized to generate the intent data that may represent an intent determined from the text data. In this example, the user utterance may be, for example, "move the music to the kitchen." In this example, the second device may be outputting audio corresponding to music. Based at least in part on the intent data, it may be determined that the user utterance corresponds to an "move" intent, which may represent an intent to output audio on the first device, which in this example would be associated with the naming indicator "kitchen," and to cease output of the audio content by the second device.

At block 1106, the process 1100 may include causing, based at least in part on determining that the audio content is to be output by the first device instead of the second device, the first device to be associated with a state of the second device. For example, each device may be associated with a state, as described above. The state of a device may be, for example, an audio-output state where the device is currently outputting audio and/or an inactive state where the device is not currently outputting audio. Additionally, when multiple devices are outputting different audio, such as when a first device is outputting a first song and a second device is outputting a second song, each of the devices may be associated with a different audio-output state. A state controller may be configured to identify and/or determine the state of one or more of the devices. Based at least in part on receiving a user utterance to control audio output on the devices, the state controller may cause control data to be sent to one or more of the devices to change the state of those devices.

For example, the second device may be currently outputting audio associated with an audio-session queue. Based at least in part on the second device currently outputting audio, the state controller may identify and/or determine that the second device is associated with a first audio-output state. The first device that is associated with the second device may not be currently outputting audio. Based at least in part on the first device not outputting audio, the state controller may identify and/or determine that the first device is associated with an inactive state. The state controller may also receive data from, for example, other components of the remote system indicating that the user desires to act with respect to output of the audio. For example, it may be determined that the user utterance corresponds to an intent to output the audio on the first device instead of on the second device, or otherwise to move the audio session from the second device to the first device. The state controller may, based at least in part on information provided by the other components, cause the inactive state of the first device to change to the audio-output state of the second device. The state controller may also cause the audio-output state of the second device to change to an inactive state.

The state controller may also be configured to cause a device of multiple associated devices to act as a hub device. The hub device may control the other devices not designated as a hub device. In these examples, data may flow from the non-hub devices to the hub device, which may communicate on behalf of the hub devices and the non-hub devices with the remote system and/or a third-party remote system. Selection of the hub device is described in more detail with respect to FIG. 8, above. In this example, the first device may be selected as the hub device based at least in part on the first device being the source device before the input data was received. Alternatively, the second device may be selected as the hub device based at least in part on the audio session being moved to the second device.

At block 1108, the process 1100 may include identifying queue data associated with the audio content being output by the second device. The queue data may be associated with the second device based at least in part on the second device outputting the audio content. For example, the queue data may represent an audio-session queue. An audio-session queue that indicates a queue of songs to be output by the second device may be associated with the second device based at least in part on the second device currently outputting the audio. It should be understood that while one device is determined to be the source device in this example, multiple device may be determined to be source devices based at least in part on audio currently being output by the devices.

In some examples, the audio-session queue is static, such as in situations where output of the queued songs is from an album of fixed songs. In other examples, the audio-session queue may be dynamic and may change based at least in part on how a user interacts with the audio being output. For example, a user's indication that he or she likes the song being output may cause the audio-session queue to change such that similar songs to the liked song are added to the queue, or moved up in the queue, while dissimilar songs are removed from the queue, or moved down in the queue.

At block 1110, the process 1100 may include causing the queue data to be dissociated from the second device. In examples, associating and/or dissociating audio-session queues may be performed after confirmatory data has been received from the third party associated with the audio-session queue. The confirmatory data may indicate that the intended retargeting of the audio-session queue from a first device to a second device was successful.

At block 1112, the process 1100 may include associating, based at least in part on causing the first device to be associated with the state of the second device, the queue data with the first device. The audio-session queue may then be associated with the first device as the determined target device. In examples, associating and/or dissociating audio-session queues may be performed after confirmatory data has been received from the third party associated with the audio-session queue. The confirmatory data may indicate that the intended retargeting of the audio-session queue from a first device to a second device was successful.

At block 1114, the process 1100 may include causing the second device to cease outputting audio content.

At block 1116, the process 1100 may include causing the first device to output the audio content. For example, if the input data was received during output of audio, such as in the middle of outputting a song, the second device may output the audio corresponding to a portion of the song that has not been output by the second device. In this way, the first device may output the same audio, or an instance of the same audio, at the same time or at substantially similar times as the second device would have output the audio if the second device were not removed from the audio-session queue.

The process 1100 may additionally, or alternatively, include receiving, from a third device, second input data representing a second user utterance. The process 1100 may also include determining, from the second input data, intent data indicating a request to identify the audio content being output by the first device. The queue data may be determined to be associated with the first device and a portion of the audio content being output by the first device may be identified. The process 1100 may also include causing output, via the third device, of audio corresponding to a response to the request. The response may be based at least in part on the portion of the audio content being output. In this way, devices that are outputting the audio content, such as the first device and/or the second device, may be queried to provide information about the audio content being output. Additionally, devices that are not outputting the audio content but that are associated with at least one of the device that are outputting the audio content may also be queried to provide the information.

The process 1100 may additionally, or alternatively, include receiving, from the third device, second input data representing a second user utterance. The process 1100 may also include determining, from the second input data, intent data indicating a request to alter output of the audio content. Based at least in part on receiving the second input data from the second device and the intent data, the process 1100 may include causing output of the audio content to be altered.

The process 1100 may additionally, or alternatively, include determining that the user utterance includes an anaphora and determining that the anaphora corresponds to the audio content based on the audio content being output by the first device at the time the input data was received. In this example, the anaphora may be the word "this," and based at least in part on the first device outputting the audio content, it may be determined that "this" corresponds to the audio content. Determining that the audio content is to be output by the first device instead of the second device may be based at least in part on determining that the anaphora refers to the audio content.

The process 1100 may additionally, or alternatively, include determining that the user utterance includes an anaphora and determining that the anaphora corresponds to an identification of the second device based at least in part on the input data being received via the second device. In this example, the anaphora may be the word "here," and based at least in part on receiving the input data from the second device, it may be determined that "here" corresponds to the second device. Determining that the audio content is to be output by the first device instead of the second device may be based at least in part on determining that the anaphora refers to the second device.

The process 1100 may additionally, or alternatively, include determining that an amount of time has passed since the queue data was associated with the second device and determining that the amount of time is more than a threshold amount of time. The process 1100 may also include causing the second device to be dissociated from the first device based at least in part on determining that the amount of time is more than the threshold amount of time. Dissociating devices may also be based at least in part on a determination that the association of the devices occurs on a previous day. The states of the devices may also be dissociated and the audio-session queue may be dissociated from one or all of the previously-associated devices.

The process 1100 may also include receiving, via the first device, second input data representing a second user utterance and determining intent data indicating a request to output second audio content. The process 1100 may also include determine that the second audio content is to be output via the second device without altering output of the first audio content via the first device. The process 1100 may also include causing the second device to output the second audio content concurrently with the first device outputting the first audio content.

The process 1100 may also include receiving, via the first device, second input data representing a second user utterance and determining, based at least in part on the second input data, intent data indicating a request to output second audio content. The process 1100 may also include determining that the first device is outputting the first audio content and causing the first device to output audio representing a request to authorize the second audio content to be output via the first device. Third input data representing a response to the request by be received via the first device and the process 1100 may include causing the first device to output the second audio content based at least in part on the third input data indicating authorization.

Figure 12:
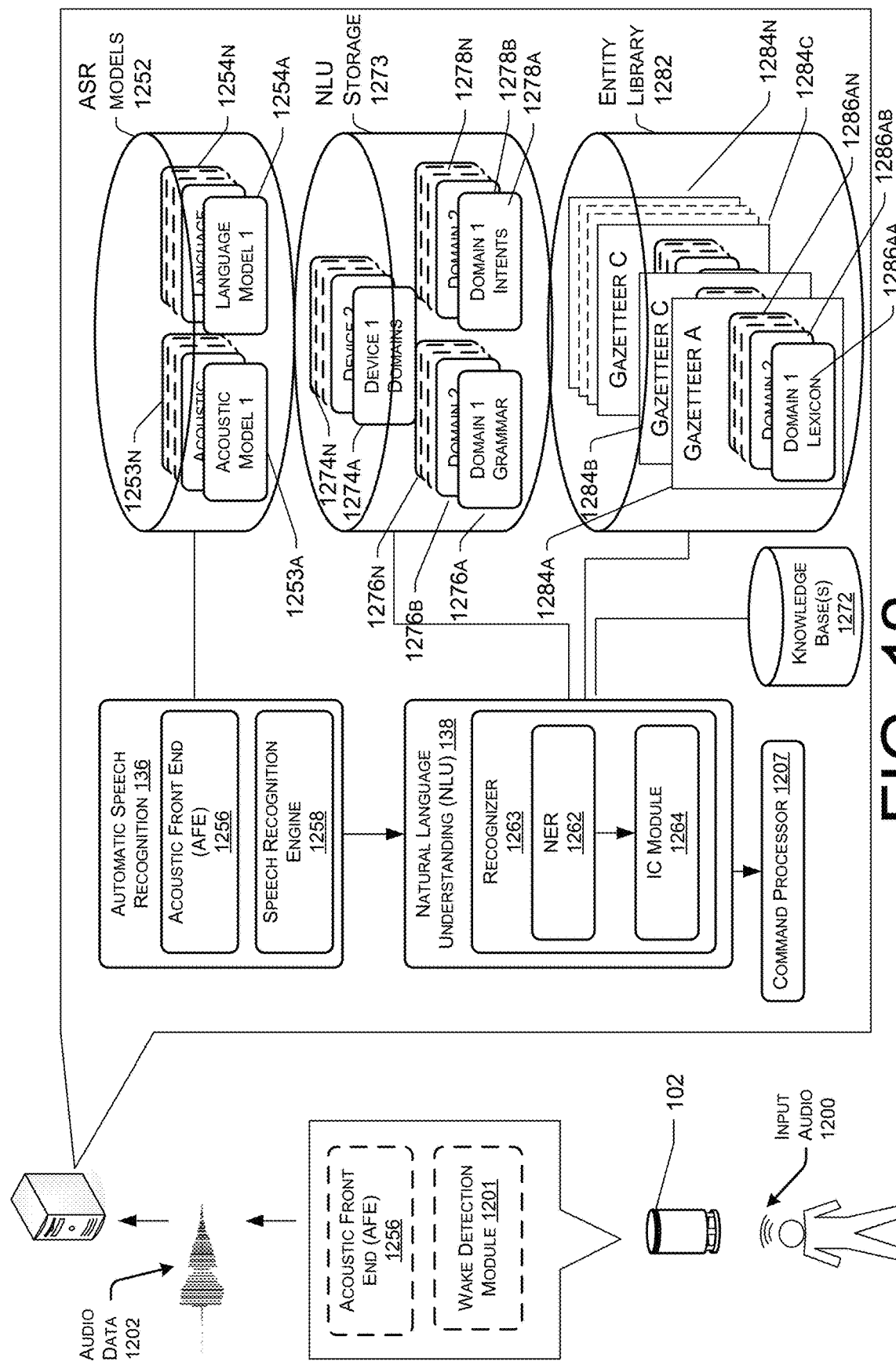
FIG. 12 illustrates a conceptual diagram of components of a speech processing system for processing audio data provided by one or more devices.

FIG. 12 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 120). The various components illustrated may be located on a same or different physical devices. Communication between various components illustrated in FIG. 12 may occur directly or across a network 118. An audio capture component, such as a microphone 112 of the device 102, or another device, captures audio 1200 corresponding to a spoken utterance. The device 102 or 104, using a wakeword detection module 1201, then processes audio data corresponding to the audio 1200 to determine if a keyword (such as a wakeword) is detected in the audio data. Following detection of a wakeword, the device 102 or 104 sends audio data 1202 corresponding to the utterance to the remote system 120 that includes an ASR module 136. The audio data 1202 may be output from an optional acoustic front end (AFE) 1256 located on the device prior to transmission. In other instances, the audio data 1202 may be in a different form for processing by a remote AFE 1256, such as the AFE 1256 located with the ASR module 136 of the remote system 120.

The wakeword detection module 1201 works in conjunction with other components of the user device, for example a microphone to detect keywords in audio 1200. For example, the device may convert audio 1200 into audio data, and process the audio data with the wakeword detection module 1201 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 1201 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1201 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1202 corresponding to input audio 1200 to the remote system 120 for speech processing. Audio data corresponding to that audio may be sent to remote system 120 for routing to a recipient device or may be sent to the remote system 116 for speech processing for interpretation of the included speech (either for purposes of enabling voice-communications and/or for purposes of executing a command in the speech). The audio data 1202 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 120, an ASR module 136 may convert the audio data 1202 into text. The ASR transcribes audio data into text data representing the words of the speech contained in the audio data 1202. The text data may then be used by other components for various purposes, such as executing system commands, inputting data, etc. A spoken utterance in the audio data is input to a processor configured to perform ASR which then interprets the utterance based on the similarity between the utterance and pre-established language models 1254 stored in an ASR model knowledge base (ASR Models Storage 1252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1253 stored in an ASR Models Storage 1252), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 136 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1256 and a speech recognition engine 1258. The acoustic front end (AFE) 1256 transforms the audio data from the microphone into data for processing by the speech recognition engine 1258. The speech recognition engine 1258 compares the speech recognition data with acoustic models 1253, language models 1254, and other data models and information for recognizing the speech conveyed in the audio data. The AFE 1256 may reduce noise in the audio data and divide the digitized audio data into frames representing time intervals for which the AFE 1256 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in speech/model storage (1252). Alternatively, post front-end processed data (such as feature vectors) may be received by the device executing ASR processing from another source besides the internal AFE. For example, the user device may process audio data into feature vectors (for example using an on-device AFE 1256) and transmit that information to a server across a network for ASR processing. Feature vectors may arrive at the remote system 120 encoded, in which case they may be decoded prior to processing by the processor executing the speech recognition engine 1258.

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, add the music to the kitchen," or "Alexa, move the music to the kitchen," or "Alexa, stop the music in the kitchen." The wake detection module may identify the wake word, otherwise described as a trigger expression, "Alexa" in the user utterance and may "wake" based on identifying the wake word. Audio data corresponding to the user utterance may be sent to the remote system 120 where the speech recognition engine 1258 may identify, determine, and/or generate text data corresponding to the user utterance, here "add the music to the kitchen," "move the music to the kitchen," or "stop the music in the kitchen."

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1258 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 120, for natural language understanding (NLU) processing, such as conversion of the text into commands for execution, either by the user device, by the remote system 120, or by another device (such as a server running a specific application like a search engine, etc.).

The device performing NLU processing 138 (e.g., server 120) may include various components, including potentially dedicated processor(s), memory, storage, etc. As shown in FIG. 12, an NLU component 138 may include a recognizer 1263 that includes a named entity recognition (NER) module 1262 which is used to identify portions of query text that correspond to a named entity that may be recognizable by the system. A downstream process called named entity resolution links a text portion to a specific entity known to the system. To perform named entity resolution, the system may utilize gazetteer information (1284a-1284n) stored in entity library storage 1282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 136 based on the utterance input audio 1200) and attempts to make a semantic interpretation of the text. That is, the NLU process determines the meaning behind the text based on the individual words and then implements that meaning. NLU processing 138 interprets a text string to derive an intent or a desired action from the user as well as the pertinent pieces of information in the text that allow a device (e.g., device 102) to complete that action. For example, if a spoken utterance is processed using ASR 136 and outputs the text "add music to the kitchen" the NLU process may determine that the user intended for the audio being output by a device also be output by another device associated with the identifier of kitchen.

The NLU may process several textual inputs related to the same utterance. For example, if the ASR 136 outputs N text segments (as part of an N-best list), the NLU may process all N outputs to obtain NLU results.

As will be discussed further below, the NLU process may be configured to parse and tag to annotate text as part of NLU processing. For example, for the text "move the music to the kitchen," "move" may be tagged as a command (to output audio on a device) and "kitchen" may be tagged as a specific device to output the audio on instead of the previous device.

To correctly perform NLU processing of speech input, an NLU process 138 may be configured to determine a "domain" of the utterance so as to determine and narrow down which services offered by the endpoint device (e.g., remote system 120 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1262 receives a query in the form of ASR results and attempts to identify relevant grammars and lexical information that may be used to construe meaning. To do so, the NLU module 138 may begin by identifying potential domains that may relate to the received query. The NLU storage 1273 includes a database of devices (1274a-1274n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1263, language model and/or grammar database (1276a-1276n), a particular set of intents/actions (1278a-1278n), and a particular personalized lexicon (1286). Each gazetteer (1284a-1284n) may include domain-indexed lexical information associated with a particular user and/or device. For example, the Gazetteer A (1284a) includes domain-index lexical information 1286aa to 1286an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 1264 parses the query to determine an intent or intents for each identified domain, where the intent corresponds to the action to be performed that is responsive to the query. Each domain is associated with a database (1278a-1278n) of words linked to intents. For example, a music intent database may link words and phrases such as "add," "move," "remove," "quiet," "volume off," and "mute" to a "mute" intent. A voice-message intent database, meanwhile, may link words and phrases such as "send a message," "send a voice message," "send the following," or the like. The IC module 1264 identifies potential intents for each identified domain by comparing words in the query to the words and phrases in the intents database 1278. In some instances, the determination of an intent by the IC module 1264 is performed using a set of rules or templates that are processed against the incoming text to identify a matching intent.

In order to generate a particular interpreted response, the NER 1262 applies the grammar models and lexical information associated with the respective domain to actually recognize a mention of one or more entities in the text of the query. In this manner, the NER 1262 identifies "slots" or values (i.e., particular words in query text) that may be needed for later command processing. Depending on the complexity of the NER 1262, it may also label each slot with a type of varying levels of specificity (such as noun, place, city, artist name, song name, device identification, audio identification, audio-session queue identification, or the like). Each grammar model 1276 includes the names of entities (i.e., nouns) commonly found in speech about the particular domain (i.e., generic terms), whereas the lexical information 1286 from the gazetteer 1284 is personalized to the user(s) and/or the device. For instance, a grammar model associated with the shopping domain may include a database of words commonly used when people discuss shopping.

The intents identified by the IC module 1264 are linked to domain-specific grammar frameworks (included in 1276) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "add the music to the kitchen" is an identified intent, a grammar (1276) framework or frameworks may correspond to sentence structures such as "add {audio-session queue} to {kitchen}."

For example, the NER module 1262 may parse the query to identify words as subject, object, verb, preposition, etc., based on grammar rules and/or models, prior to recognizing named entities. The identified verb may be used by the IC module 1264 to identify intent, which is then used by the NER module 1262 to identify frameworks. A framework for the intent of "play a song," meanwhile, may specify a list of slots/fields applicable to play the identified "song" and any object modifier (e.g., specifying a music collection from which the song should be accessed) or the like. The NER module 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 1262 may search the database of generic words associated with the domain (in the knowledge base 1272). So, for instance, if the query was "add the music to the kitchen," after failing to determine which device corresponds to the identify of "kitchen," the NER component 1262 may search the domain vocabulary for device identifiers associated with the word "kitchen." In the alternative, generic words may be checked before the gazetteer information, or both may be tried, potentially producing two different results.

The output data from the NLU processing (which may include tagged text, commands, etc.) may then be sent to a command processor 1207. The destination command processor 1207 may be determined based on the NLU output. For example, if the NLU output includes a command to send a message, the destination command processor 1207 may be a message sending application, such as one located on the user device or in a message sending appliance, configured to execute a message sending command. If the NLU output includes a search request, the destination command processor 1207 may include a search engine processor, such as one located on a search server, configured to execute a search command. After the appropriate command is generated based on the intent of the user, the command processor 1207 may provide some or all of this information to a text-to-speech (TTS) engine. The TTS engine may then generate an actual audio file for outputting the audio data determined by the command processor 1207 (e.g., "playing in the kitchen," or "music moved to the kitchen"). After generating the file (or "audio data"), the TTS engine may provide this data back to the remote system 120.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 138 during runtime operations where NLU operations are performed on text (such as text output from an ASR component 136). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1263. Each recognizer may include various NLU components such as an NER component 1262, IC module 1264 and other components such as an entity resolver, or other components.

For example, a messaging domain recognizer 1263-A (Domain A) may have an NER component 1262-A that identifies what slots (i.e., portions of input text) may correspond to particular words relevant to that domain. The words may correspond to entities such as (for the messaging domain) a recipient. An NER component 1262 may use a machine learning model, such as a domain specific conditional random field (CRF) to both identify the portions corresponding to an entity as well as identify what type of entity corresponds to the text portion. The messaging domain recognizer 1263-A may also have its own intent classification (IC) component 1264-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 116 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 120, as illustrated herein are exemplary, and may be located in a stand-alone device or may be included, in whole or in part, as a component of a larger device or system, may be distributed across a network or multiple devices connected by a network, etc.

Figure 13:
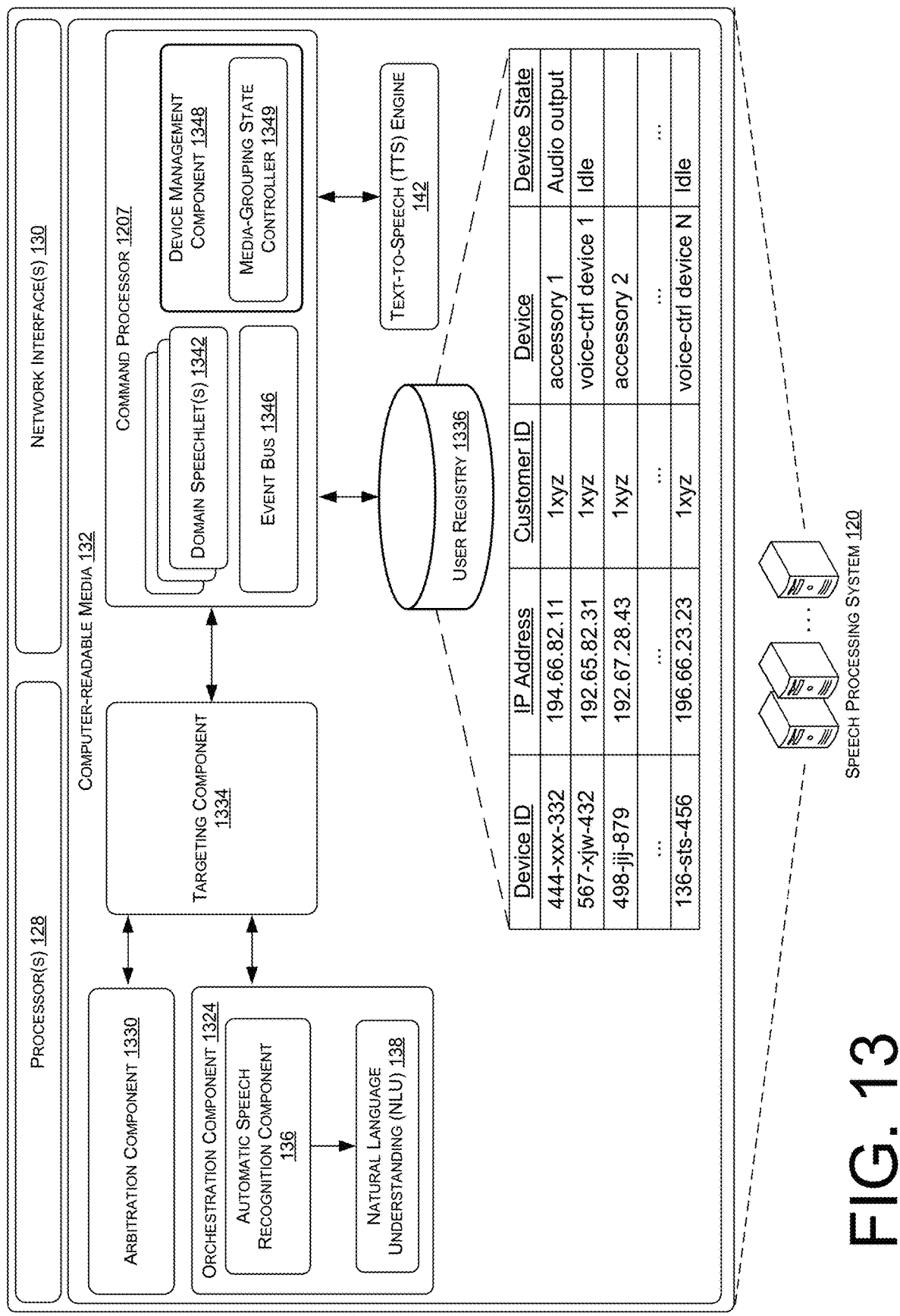
FIG. 13 illustrates a conceptual diagram of components of a speech processing system associating audio output commands with multiple devices.

FIG. 13 illustrates a conceptual diagram of components of a speech processing system 120 associating audio output commands with multiple devices, including a command processor 1207 configured to generate a command that the selected voice-enabled device uses to respond to a user utterance. As used with respect to FIG. 13, a voice-enabled device may include a communal device, such as the communal device 102 from FIG. 1. As illustrated in FIG. 13, the speech processing system 120, including the orchestration component 1324 and a speech processing component 132 comprising the ASR component 136 and the NLU component 138, may be coupled to the targeting component 1334 and provide the targeting component 1334 with the intent determined to be expressed in the user utterance. Further, the arbitration component 1330 may provide the ranked list of devices to the targeting component 1334, as well as device indicators (e.g., IP addresses, devices names, etc.) for one or more of the voice-enabled devices in the ranked list of devices. The targeting component 1334 may then perform techniques to determine a target device (e.g., a device to perform the requested operation), and provide various data to the command processor 1207. For instance, the targeting component 1334 may provide the command processor 1207 with various device identifiers of the voice-enabled devices, the determined target device, the determined intent and/or command, etc. By way of example, the targeting component 1334 may determine which devices to add to a grouping of device, which devices to remove from a grouping of devices, and/or which devices to move an audio-session to. The association and dissociation of device states and/or audio-session queues using the targeting component 1334 is described in more detail with respect to FIG. 1, above.

The command processor 1207 and/or NLU component 138 may determine a domain based on the intent and, based on this determination, route the request corresponding to the audio data to the appropriate domain speechlet, such as the illustrated domain speechlets 1342. The domain speechlet 1342 may comprise any type of device or group of devices (e.g., hardware device, virtual devices or partitions, server, etc.), and may receive the text data and/or an intent associated with the audio signals and may determine how to respond to the request. For instance, the intent for a command "add the music to the kitchen" may be routed to a music domain speechlet 1342, which controls devices, such as speakers, connected to the voice-enabled devices. The music domain speechlet 1342 may determine a command to generate based on the intent of the user to output audio on a device associated with the kitchen identifier as when as continuing to output the audio on another device that is currently outputting the audio. Additionally, the music domain speechlet 1342 may determine additional content, such as audio data, to be output by one of the voice-enabled devices, such as "kitchen has been added to your audio session."

Various types of domain speechlets 1342 may be used to determine which devices to send commands to and/or to use in response to a user utterance, as well as the appropriate response and potential additional content (e.g., audio data). For example, the domain speechlets 1342 may include a third party skills domain speechlet 1342, which may handle intents associated with gaming, productivity, etc., a music domain speechlet 1342, which may handle intents associated with music play requests (e.g., Amazon Music, Pandora, Spotify, iHeart, etc.), and/or an information domain speechlet 1342, which may handle requests for information associated, for example, with the status of a particular device and/or content being utilized and/or output by a particular device and/or group of devices.

After the domain speechlet 1342 generates the appropriate command, which may be described herein as directive data, based on the intent of the user, and/or provides additional content, such as audio data, to be output by one of the voice-enabled devices, the domain speechlet 1342 may provide this information back to the speech system 120, which in turns provides some or all of this information to a text-to-speech (TTS) engine 142. The TTS engine 142 then generates an actual audio file for outputting the second audio data determined by the domain speechlet 1342. After generating the file (or "audio data"), the TTS engine 142 may provide this data back to the speech system 120.

The speech system 120 may then publish (i.e., write) some or all of this information to an event bus 1346. That is, the speech system 120 may provide information regarding the initial request (e.g., the speech, the text, the domain/intent, etc.), the response to be provided to the voice-enabled device, or any other information pertinent to the interaction between the voice-enabled device and the speech processing system 120 to the event bus 1346.

Within the speech processing system 120, one or more components or services may subscribe to the event bus 1346 so as to receive information regarding interactions between user devices and the speech processing system 120. In the illustrated example, for instance, the device management component 1348 may subscribe to the event bus 1346 and, thus, may monitor information regarding these interactions. In some examples, monitoring information in the event bus 1346 may comprise communications between various components of the speech processing system 120. For example, the targeting component 1334 may monitor the event bus 1346 to identify device state data for voice-enabled devices. In some examples, the event bus 1346 may "push" or send indications of events and/or device state data to the targeting component 1334. Additionally, or alternatively, the event bus 1346 may be "pulled" where the targeting component 1334 sends requests to the event bus 1346 to provide an indication of device state data for a voice-enabled device. The event bus 1346 may store indications of the device states for the devices, such as in a database (e.g., user registry 1336), and using the stored indications of the device states, send the device state data for voice-enabled devices to the targeting component 1334. Thus, to identify device state data for a device, the targeting component 1334 may send a request to the event bus 1346 (e.g., event component) to provide an indication of the device state data associated with a device, and receive, from the event bus 1346, the device state data that was requested.

The device management component 1348 functions to monitor information published to the event bus 1346 and identify events that may trigger action. For instance, the device management component 1348 may identify (e.g., via filtering) those events that: (i) come from voice-enabled devices that are associated with secondary device(s) (e.g., have secondary devices in their environments such as televisions, personal computing devices, etc.), and (ii) are associated with supplemental content (e.g., image data, video data, etc.). The device management component 1348 may reference the user registry 1336 to determine which voice-enabled devices are associated with secondary devices, as well as determine device types, states, and other capabilities of these secondary devices. For instance, the device management component 1348 may determine, from the information published to the event bus 1346, an identifier associated with the voice-enabled device making the corresponding request or the voice-enabled device selected to respond to or act upon the user utterance. The device management component 1348 may use this identifier to identify, from the user registry 1336, a user account associated with the voice-enabled device. The device management component 1348 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like. As used herein, the secondary device may include one or more of the communal devices 102 from FIG. 1. For example, the secondary devices may include speakers that may wirelessly communicate with the voice-enabled device and/or one or more other secondary devices, such as personal devices.

The device management component 1348 may determine whether a particular event identified is associated with supplemental content. That is, the device management component 1348 may write, to a datastore, indications of which types of events and/or which primary content or responses are associated with supplemental content. In some instances, the speech processing system 120 may provide access to third-party developers to allow the developers to register supplemental content for output on secondary devices for particular events and/or primary content. For example, if a voice-enabled device is to output that the weather will include thunder and lightning, the device management component 1348 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1348 may store an association between the primary response or content (e.g., outputting of information regarding the world's largest mammal) and corresponding supplemental content (e.g., the audio data, image data, or the like). In some instances, the device management component 1348 may also indicate which types of secondary devices are to output which supplemental content. For instance, in the instant example, the device management component 1348 may store an indication that secondary devices of a class type "tablet" are to output a picture of a blue whale. In these and other instances, meanwhile, the device management component 1348 may store the supplemental content in association with secondary-device capabilities (e.g., devices with speakers output the audio commentary, devices with screens output the image, etc.).

The device management component 1348 may also determine how to transmit response and/or supplement content (and/or information acquiring the content) to the voice-enabled devices and/or the secondary devices. To make this determination, the device management component 1348 may determine a device type of the voice-enabled devices and/or secondary devices, capabilities of the device(s), or the like, potentially as stored in the user registry 1336. In some instances, the device management component 1348 may determine that a particular device is able to communicate directly with the speech processing system 1210 (e.g., over WiFi) and, thus, the device management component 1348 may provide the response and/or content directly over a network 118 to the secondary device (potentially via the speech system 120). In another example, the device management component 1348 may determine that a particular secondary device is unable to communicate directly with the speech processing system 120, but instead is configured to communicate with a voice-enabled device in its environment over short-range wireless networks. As such, the device management component 1348 may provide the supplement content (or information) to the speech system 120, which in turn may send this to the voice-enabled device, which may send the information over a short-range network to the secondary device.

In addition to the above, the device management component 1348 may include the media-grouping state controller 140. The media-grouping state controller 140 may be configured to perform the same or similar operations as the media-grouping state controller 140 described with respect to FIG. 1.

The computer-readable media 132 may further include the user registry 1336 that includes data regarding user profiles as described herein. The user registry 1336 may be located part of, or proximate to, the speech processing system 120, or may otherwise be in communication with various components, for example over the network 118. The user registry 1336 may include a variety of information related to individual users, accounts, etc. that interact with the voice-enabled devices, and the speech processing system 120. For illustration, the user registry 1336 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 1336 may store indications of associations between various voice-enabled devices and/or secondary device, such as virtual clusters of devices, states of devices, and associations between devices and audio-session queues. The user registry 1336 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the command processor 1207 and/or the domain speechlets 1342 may determine, based on the stored device states in the user registry 1336, a current device state of the voice-enabled devices. Rather than receiving device states for the voice-enabled devices, in metadata, the device states may already have been determined or received and stored in the user registry 1336. Further, the user registry 1336 may provide indications of various permission levels depending on the user. As an example, the speech system 120 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 1346 may publish different events which indicate device states to various entities or components that subscribe to the event bus 1346. For instance, if an event of "play music" occurs for a voice-enabled device, the event bus 1346 may publish the indication of this event, and thus the device state of outputting audio may be determined for the voice-enabled device. Thus, various components, such as the targeting component 1334, may be provided with indications of the various device states via the event bus 1346. The event bus 1346 may further store and/or update device states for the voice-enabled devices in the user registry 1336. The components of the speech processing system 120 may query the user registry 1336 to determine device states.

A particular user profile may include a variety of data that may be used by the system 120. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
non-transitory computer-readable media storing instructions that, when executed by the one or more processors, causes the one or more processors to perform operations comprising:
receiving first input data representing a first user utterance that started while a first device outputs content, the first device operating in a state;
determining, based at least in part on the first input data, that the content is to be output by a second device in time synchronization with the first device;
causing, based at least in part on the first input data, the second device to match the state of the first device to output the content in time synchronization;
causing, based at least in part on the first input data, the second device to output the content in time synchronization with output of the content by the first device; and
causing output of first audio indicating that the second device is outputting the content in time synchronization with the first device.

2. The system of claim 1, the operations further comprising:
identifying data representing a queue associated with the content; and
associating, based at least in part on determining that the content is to be output by the second device in time synchronization with the first device, the data with the second device.

3. The system of claim 2, the operations further comprising:
receiving, from the second device, second input data representing a second user utterance;
determining, based at least in part on the second input data, intent data indicating a request to identify the content output by the first device;
identifying, based at least in part on the data representing the queue, a portion of the content being output by the first device; and
causing output of second audio corresponding to a response to the request, the response based at least in part on the portion of the content being output.

4. The system of claim 1, the operations further comprising:
receiving, from the first device, second input data representing a second user utterance;
determining, based at least in part on the second input data, intent data indicating a request to alter output of the content;
generating, based at least in part on the intent data, directive data indicating that output of the content is to be altered;
sending a first instance of the directive data to the first device, the first instance of the directive data causing output of the content to be altered on the first device; and
sending, based at least in part on the first device being associated with the second device, a second instance of the directive data to the second device, the second instance of the directive data causing output of the content to be altered on the second device.

5. The system of claim 1, wherein:
the first device is operating in a first state; and
causing the second device to output the content in time synchronization with the first device includes causing the second device to transition from a second state to the first state.

6. The system of claim 1, the operations further comprising:
receiving, from the second device, second input data indicating a request to adjust a volume at which the content is output;
causing adjustment of the volume on the second device based at least in part on the second input data; and
causing adjustment of the volume on the first device based at least in part on the first device outputting the content in time synchronization with the second device.

7. The system of claim 1, the operations further comprising:
determining that an amount of time has passed since output of the content;
determining that the amount of time satisfies a threshold amount of time; and
causing the second device to be dissociated from the first device based at least in part on the amount of time satisfying the threshold amount of time.

8. The system of claim 1, wherein the content comprises first content, and the operations further comprise:
receiving, from the first device, second input data representing a second user utterance;
determining, based at least in part on the second input data, intent data indicating a request to output second content by the first device without altering output of the first content by the second device;
generating, based at least in part on the intent data, directive data to dissociate the first device from the second device; and
sending the directive data to the first device, the directive data causing the first device to be dissociated from the second device.

9. A method comprising:
receiving input data representing a user utterance that started while a first device and a second device output content synchronously;
causing output of first audio indicating that the second device is outputting the content in time synchronization with the first device;
determining, based at least in part on the input data, that the first device is to cease output of the content while the second device is to continue output of the content;
causing, based at least in part on the input data, the first device to cease output of the content; and
causing, based at least in part on the input, the second device to continue output of the content.

10. The method of claim 9, further comprising:
identifying data representing a queue associated with the content; and
disassociating, based at least in part on the input data, the data from the first device.

11. The method of claim 10, further comprising:
sending, to a remote system, state data indicating that the first device is operating in a first state and the second device is operating in a second state;
sending, to the remote system, association data indicating that the data representing the queue is associated with the second device instead of the first device;
receiving, from the remote system, request data indicating a request to alter output of the content; and
sending, to the second device, directive data to alter output of the content on the second device based at least in part on the request data.

12. The method of claim 10, further comprising:
receiving, from a third device, second input data indicating a request to identify the content output by the second device;
determining that the data representing the queue is associated with the second device;
identifying, based at least in part on the data representing the queue, a portion of the content being output by the second device; and
causing output of second audio corresponding to a response to the request, the response based at least in part on the portion of the content being output.

13. The method of claim 9, further comprising:
receiving, from the second device, second input data indicating a request to adjust a volume at which the content is output;
generating, based at least in part on the second input data, directive data indicating that the volume at which the content is output is to be adjusted;
causing adjustment of the volume on the second device based at least in part on the directive data;
determining that one or more additional devices are associated with the second device; and causing adjustment of the volume on the one or more additional devices based at least in part on the one or more additional devices being associated with the second device.

14. The method of claim 9, wherein the first device and the second device are operating in a first state and causing the first device to cease output of the content includes causing the first device to transition to a second state while the second device remains in the first state.

15. The method of claim 9, further comprising:
receiving, from the first device, second input data representing a second user utterance;
determining, based at least in part on the second input data, intent data indicating a request to alter output of the content;
generating, based at least in part on the intent data, directive data indicating that output of the content is to be altered; and
sending, based at least in part on the second device outputting the content, the directive data to the second device, the directive data causing output of the content to be altered on the second device.

16. The method of claim 9, further comprising:
generating, based at least in part on the input data, directive data to dissociate the first device from the second device; and
sending the directive data to the first device, the directive data causing the first device to be dissociated from the second device.

17. The method of claim 9, wherein the content comprises first content and the method further comprises:
receiving, from the second device, second input data indicating a first request to output second content by the second device;
determining that the second device is outputting the first content;
based at least in part on determining that the second device is outputting the first content, causing the second device to output second audio representing a second request to authorize the second content to be output by the second device;
receiving third input data representing a response to the request; and
causing the second device to output the second content based at least in part on the third input data.

18. The method of claim 9, further comprising:
receiving, at the first device and after ceasing output of the content on the first device, second input data indicating a request to resume output of the content in time synchronization with the second device; and
causing, based at least in part on the second input data, the first device to output the content in time synchronization with output of the content by the second device.

19. The method of claim 9, further comprising:
receiving, at the first device, second input data representing a request to transfer output of the content from the second device to the first device;
generating, based at least in part on the second input data, first directive data to cause the first device to output the content;
generating, based at least in part on the second input data, second directive data to cause the second device to cease output of the content;
sending the first directive data to the first device; and
sending the second directive data to the second device.

20. The method of claim 9, further comprising:
receiving, from a third device, second input data representing a second user utterance;
determining, based at least in part on the second input data, intent data indicating a request to alter output of the content on the first device; and
causing, based at least in part on the intent data, output of the content on the first device and the second device to be altered.

\* \* \* \* \*